United States Patent
Schmanski

(10) Patent No.: US 7,339,136 B2
(45) Date of Patent: Mar. 4, 2008

(54) BREAD IMPALING COOKING UTENSIL

(75) Inventor: Donald W. Schmanski, Reno, NV (US)

(73) Assignee: Hole-e-Cow Corp., Reno, NV (US)

(*) Notice: Subject to any disclaimer, the term of this patent is extended or adjusted under 35 U.S.C. 154(b) by 645 days.

(21) Appl. No.: 10/825,863

(22) Filed: Apr. 16, 2004

(65) Prior Publication Data

US 2004/0250691 A1    Dec. 16, 2004

Related U.S. Application Data

(60) Provisional application No. 60/464,078, filed on Apr. 18, 2003.

(51) Int. Cl.
*A47J 37/08* (2006.01)

(52) U.S. Cl. ............... 219/386; 219/385; 219/523; 219/534; 219/537; 99/419; 426/280

(58) Field of Classification Search ............... None
See application file for complete search history.

(56) References Cited

U.S. PATENT DOCUMENTS

| | | | |
|---|---|---|---|
| 1,589,850 A * | 6/1926 | Haskell | 426/138 |
| 1,802,532 A * | 4/1931 | Pulver | 426/391 |
| 1,902,564 A | 3/1933 | Mabey | |
| 1,990,412 A | 2/1935 | Merritt | |
| 1,992,270 A * | 2/1935 | Wilkes | 219/521 |
| 2,059,133 A | 10/1936 | Merritt | |
| 2,648,275 A | 8/1953 | Thompson | |
| 2,735,356 A | 2/1956 | Sacks | |
| 3,377,943 A | 4/1968 | Martin | |
| 3,635,146 A | 1/1972 | Aubert | |
| 3,656,968 A * | 4/1972 | Allen | 426/280 |
| 3,792,653 A | 2/1974 | Davidson | |
| 3,965,808 A | 6/1976 | Chomette | |
| 4,119,020 A | 10/1978 | Sharp et al. | |
| 4,214,517 A * | 7/1980 | Caldwell | 99/428 |
| 4,272,669 A * | 6/1981 | Yamanaka et al. | 219/385 |
| 5,000,084 A | 3/1991 | Walliker | |
| 5,897,900 A * | 4/1999 | Groulx et al. | 426/280 |
| 6,123,015 A | 9/2000 | McLain et al. | |
| 6,416,804 B1 | 7/2002 | Sherwin | |

\* cited by examiner

*Primary Examiner*—J. Pelham
(74) *Attorney, Agent, or Firm*—Thorpe North & Western LLP

(57) ABSTRACT

The present invention features a cooking utensil for creating an elongated cavity in a bread item, wherein a meat item may be inserted. The cooking utensil comprises a bread-impaling spike supported by and extending from a base member, wherein the bread-impaling spike comprises an elongated body portion and a piercing end portion, each of which are configured to pierce the bread item and form a cavity therein, and wherein the elongated body portion has a shape configured to form at least two condiment receiving channels within the cavity of the bread item upon inserting the meat item. The condiment receiving channels are defined by at least one wall of the cavity and the inserted meat item.

24 Claims, 14 Drawing Sheets

BREAD IMPALING COOKING UTENSIL

RELATED APPLICATIONS

This application claims priority to U.S. Provisional Application Ser. No. 60/464,078, filed Apr. 18, 2003, and entitled, "Bread Impaling Cooking Utensil," which is incorporated by reference in its entirety herein.

FIELD OF THE INVENTION

The present invention relates generally to cooking utensils. More particularly, the present invention relates to a cooking utensil used for impaling a bread item and for forming a cavity within the bread item, wherein the cavity creates a series of pockets or condiment receiving channels for receiving condiments therein prior to or subsequent to a food item being inserted into the cavity.

BACKGROUND OF THE INVENTION AND RELATED ART

Cooking utensils used for forming an elongated cavity within a bread item and toasting the interior of the bread item are well known. Such a cooking utensil is disclosed in U.S. Pat. No. 3,965,808 to Chomette, which describes an elongated cylindrical spike that is used to puncture and extend within the bread item to form a cavity. The spike is heated with an internal heating element to toast the surface of the bread item within the cavity. Once the toasting is complete, the bread item can be removed to receive various condiments and a meat item within the cavity. However, the cavity formed with this cooking utensil includes a continuous elongated cavity simply sized to receive the meat item. As such, there is difficulty in inserting the meat item, such as, a frankfurter or sausage within the cavity while maintaining a sufficient amount of room for condiments, such as relish, ketchup, mustard, etc., along the entire length of the cavity and the meat item. Often, trying to spread and position the condiments over the entire length of the cavity around the meat item results in smashing or tearing the bread item.

Another problem evident with the Chomette reference and the present state of the art is found in the difficulty of manually centering and inserting the bread item without having the elongated spike miss the center and puncture holes through side portions of the bread item. Such incidences can cause waste and often result in the food-preparer burning his or her hands or fingers while manually trying to penetrate the bread item with the heated cylindrical spike.

It would therefore be advantageous to provide a cooking utensil configured to form an elongated cavity in a bread item that substantially prevents the above-described difficulties and problems in the present state of the art.

SUMMARY OF THE INVENTION

In light of the problems and deficiencies inherent in the prior art, the present invention seeks to overcome these by providing a cooking utensil capable of impaling a bread item to form a cavity therein, as well as to provide several defined condiment receiving channels configured for receiving condiments between one or more walls of the formed cavity and an inserted meat item. The present invention further seeks to provide an easy and efficient impaling system designed to facilitate the creation of a cavity and various condiment receiving channels within a bread item by providing a bread basket that is displaceable with respect to the impaling spike, wherein the impaling of several bread items is made more consistent over prior related devices operated by hand.

To achieve the foregoing objects, and in accordance with the invention as embodied and broadly described herein, the present invention features a cooking utensil for creating an elongated cavity in a bread item, wherein a meat item may be inserted. In one exemplary embodiment, the cooking utensil comprises a bread-impaling spike supported by and extending from a base member and configured to impale a bread item, wherein the bread-impaling spike includes an elongated body portion having an equilateral surface configuration configured to form a defined cavity within the bread item, as well as at least one condiment receiving channel therein. The condiment receiving channel is typically located at an intersection of two or more cavity surfaces and is defined by a divergence of these cavity surfaces from the meat item, or rather the surfaces of the meat item such that a volume of space is created. The condiment receiving channels are advantageous in that they are configured to receive a condiment therein. The cooking utensil further comprises a piercing end portion formed with the elongated body portion for initially piercing said bread item.

In another exemplary embodiment, the cooking utensil comprises a bread-impaling spike having an elongated body portion of non-uniform cross-section having an external surface shaped to define at least two different widths extending laterally with respect to a longitudinal axis of the elongated body portion. Each of the at least two different widths is defined between opposing sides of the external surface through the longitudinal axis and are operable to form a condiment receiving channel extending a substantial distance along a longitudinal length in the cavity of the bread item to facilitate filling the cavity with the elongated meat item and condiments in the condiment receiving channel. Similarly, the bread impaling spike further comprises a piercing end portion formed with the elongated body portion that is configured to initially pierce the bread item.

In still another exemplary embodiment, the cooking utensil comprises a bread-impaling spike supported by and extending from a base member configured to form a cavity within a bread item, wherein the bread-impaling spike comprises an elongated body comprising an external surface shaped to define at least two lengths comprising a diagonal length and a side lateral length. Each of the lengths is measured as extending through a longitudinal axis of the elongated body portion, wherein the diagonal length extends between opposing corners of a cross-section of the elongated body portion, and the lateral length extends between opposing sides of the cross-section and orthogonal to the longitudinal axis. Each of these two lengths effectively define the size dimensions of the bread-impaling spike, which is operable to form the condiment receiving channel that extends a substantial distance along a longitudinal length within the cavity.

An alternative way to describe some of the exemplary embodiments of the bread-impaling spike is to say that the elongated body portion comprises a plurality of planar surfaces formed together about and around a longitudinal axis to create a closed-form cross-sectional geometric shape.

The cooking utensil may further comprise a heat source configured to supply heat to the bread-impaling spike for the purpose of toasting at least one interior wall of the bread-item defining the cavity.

The cooking utensil of the present invention may further comprise an impaling system for facilitating the impaling process. While several exemplary embodiments exist, the impaling system essentially functions to retain a bread item within various types of bread baskets, wherein the bread basket is configured to then engage a guide system. The guide system is configured to align the bread basket and the contained bread item with the bread-impaling spike and to guide the bread item over or onto the bread-impaling spike, thus impaling the bread item. Of course, the guide system also facilitates removal of the bread item from the spike.

It can also be said that the present invention comprises a bread item, wherein the bread item comprises a cavity that mirrors the shape of the bread-impaling spike. Specifically, the bread item may comprise an elongate body and a cavity within the elongate body formed from a bread-impaling device, wherein the cavity comprises at least one cavity surface and a length that extends along at least a portion of a longitudinal axis of the bread item. Moreover, the bread item further comprises at least one condiment receiving channel disposed within and extending along at least a portion of the length of the formed cavity, wherein the condiment receiving channel is defined by a divergence of a cavity surface away from an inserted meat item, thus creating a defined volume of space configured for receiving condiments therein.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 7-B illustrates a cross-sectional view of the bread item, wherein the cavity comprises a rectangular cross-section;

FIG. 7-C illustrates a cross-sectional view of the bread item, wherein the cavity comprises a triangular cross-section;

FIG. 7-D illustrates a cross-sectional view of the bread item, wherein the cavity comprises a cross-section comprising tangent curved segments;

FIG. 7-E illustrates a cross-sectional view of the bread item, wherein the cavity comprises a pentagonal cross-section FIG. 7-F illustrates a cross-sectional view of the bread item, wherein the cavity comprises a hexagonal cross-section;

FIG. 7-G illustrates a cross-sectional view of the bread item, wherein the cavity comprises a octagonal cross-section;

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention, as represented in FIGS. 1 through 17, is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes a method and system for impaling a bread item for the purpose of creating a cavity therein, wherein the cavity comprises a plurality of condiment receiving channels having a sufficient volume of space for receiving condiments therein, wherein the channels are defined by the walls or internal surfaces of the bread item and the food item placed within the bread item. Stated differently, the condiment receiving channels are defined by the divergence of the walls of the cavity from the surface of the inserted food item, such that upon divergence, a volume of space or pocket is created and defined. These pockets effectively create one or more condiment receiving channels within the cavity between the cavity walls and the meat item, wherein the channels function to receive condiments therein.

Although the present invention may be embodied in several different configurations or designs, the embodiments most developed and the ones given the most attention herein are the embodiments illustrated in FIGS. 4-13, wherein the bread-impaling spike comprises a uniform, equilateral cross-section. An example of this embodiment is the Hole-e-Cow™ bread-impaling cooking device manufactured and sold by Don Schmanski of Koloa Town, Kauai, Hi.

Figure 2:
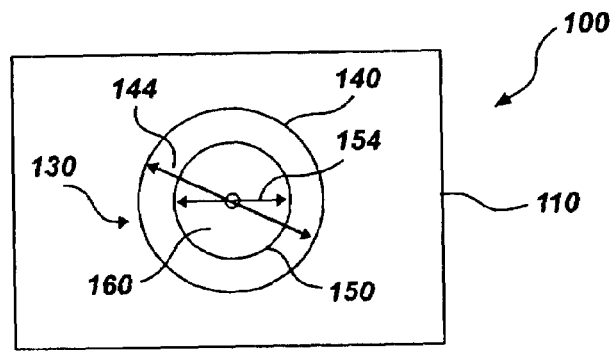
FIG. 2 illustrates a top view of the cooking utensil in FIG. 1, depicting the bread-impaling spike having a circular configuration.
Figure 1:
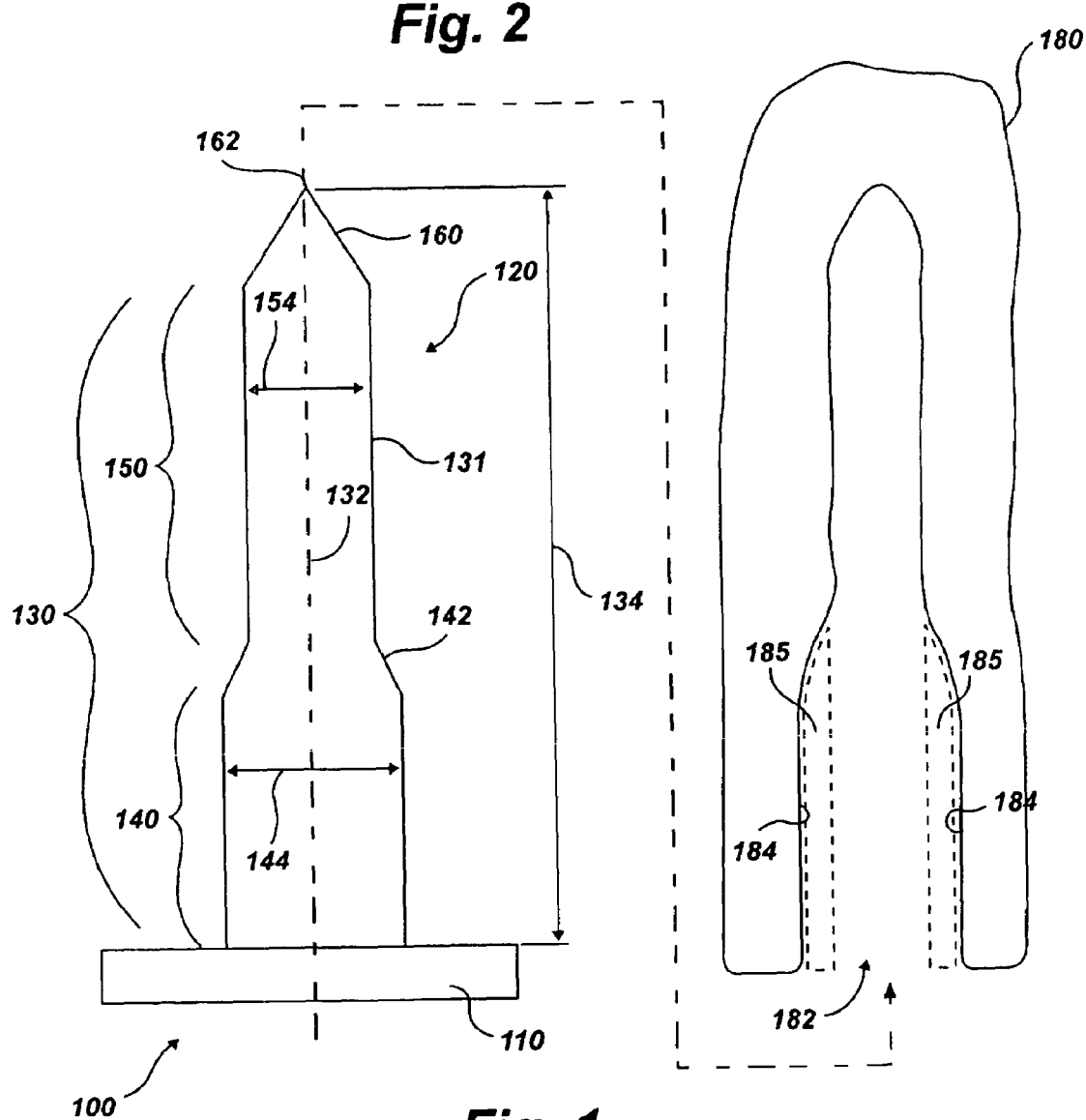
FIG. 1 illustrates a front view of a cooking utensil and a cross-sectional view of a bread item having a cavity formed therein, depicting the cooking utensil having a bread-impaling spike with a bottom portion and an upper portion with different widths which form a corresponding cavity within the bread item, according to an embodiment of the present invention.
Figure 3:
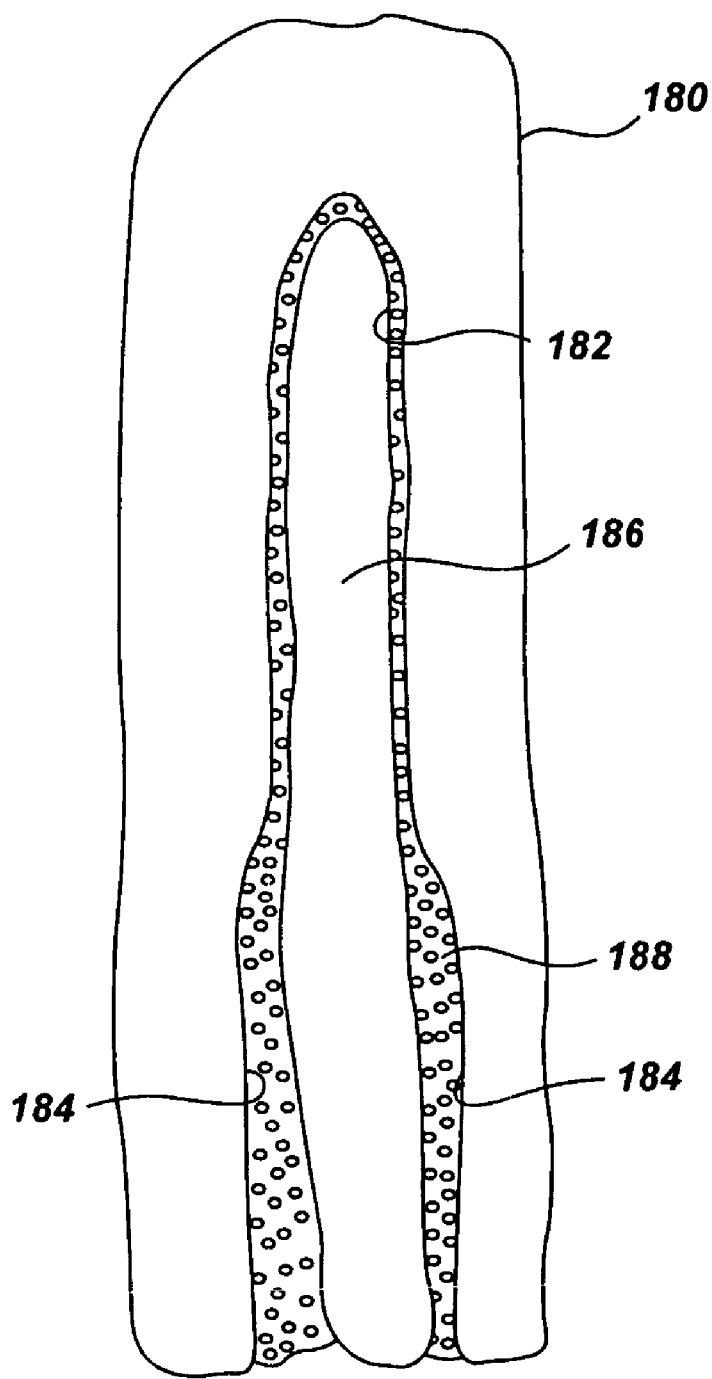
FIG. 3 illustrates a cross-sectional view of the bread item having a meat item disposed in the cavity, depicting a condiment receiving channel filled with condiments disposed around the meat item.

FIGS. 1-3 illustrate one exemplary embodiment of a cooking utensil 100 configured to form a cavity 182 in a bread item 180 sized and configured to receive a primary food item 186 (hereinafter meat item 186) along with various condiments 188 within the cavity 182. The primary food item 186 is typically a meat item, such as frankfurters, various types of sausages and/or the like, and the condiments 188 can include items such as relish, ketchup, mustard, or any other suitable food product.

As shown, the cooking utensil 100 comprises a bread-impaling spike 120 removably mounted to a base member 110, which is in turn, removably mounted to a hot plate or some other suitable heat source. The heat source operates to heat the impaling spike 120 between approximately 200 to 450 degrees Fahrenheit. As such, the heated impaling spike 120 is configured to impale the bread item 180 and extend longitudinally into the bread item to form the cavity 182 while also toasting the surfaces or interior walls of the bread item 180 within and defining the cavity 182.

The bread impaling spike 120 defines a longitudinal length 134 including an elongated portion 130 with a piercing end portion 160 extending from an end of the elongated portion 130. Such an elongated portion 130 includes an external surface 131 having at least two different widths defined to extend laterally and orthogonally with respect to a longitudinal axis 132 of the elongated portion 130. Each of the at least two different widths are further defined between opposing sides of the external surface 131 through the longitudinal axis 132. As such, the elongated portion 130 having the at least two different widths is operable to form a condiment receiving channel 184 defined in the cavity 182 in the bread item 180. The condiment receiving channel 184 is configured to facilitate ready access of condiments 188 within the cavity 182 along with the food item 186. Such a condiment receiving channel 184 extends a substantial distance along a longitudinal length of the cavity in the bread item 180. A substantial distance is defined to be at least ⅙ the longitudinal length of the cavity. As such, the condiment receiving channel 184 provides additional volume space or an additional pocket 185 within the cavity to receive the food item 186 and, more specifically, to receive the condiments 188 that are to accompany the inserted food item 186. With this arrangement, the condiment receiving channel 184 substantially eliminates the difficulties of tearing or smashing the bread item 180 while trying to spread or position the condiments 188 along the entire length of the food item 186 within the cavity 182.

The bread-impaling spike 120 can be formed of a metallic material, such as steel, copper and aluminum, and/or alloys thereof or any suitable metallic material that readily conducts heat there through. The spike 120 can include, but is not limited to, a Teflon coating over the metallic material to facilitate a non-stick finish to the spike 120 or any other suitable coating so that when food becomes charred on the surface of the spike 120 such charred food can be readily removed.

Referring now to FIGS. 1 and 2, the elongated portion 130 can be formed integrally with or coupled to the base member 110 by any suitable fastening means, such as with screw or bolt-type fasteners, welding, interference-type fits, or any other suitable fastening means known in the art. In one embodiment, the base member 110 can be configured to be secured to and in communication with a heat source, such as a hot plate or the like, in order to serve as a heat sink with respect to the heat source for the purpose of conducting heat to the bread-impaling spike 120. As such, the base member can be formed of a metallic material such as steel, copper, aluminum, brass or any other suitable heat conducting material.

In another embodiment of the invention, the elongated portion 130 includes a non-uniform cross-section, wherein a bottom portion and an upper portion extend along the longitudinal axis 132 of the elongated portion 130. The bottom portion 140 may be cylindrically shaped or may comprise any suitable shaped configuration, such as a square in cross-section. The bottom portion 140 is coupled to or extends from the base member 110 at one end of the bottom portion 140. The bottom portion 140 is sized and configured to include a length defined along the longitudinal axis 132 and a bottom width 144 defined laterally and orthogonally with respect to the longitudinal axis 132. The bottom portion 140 extends longitudinally to the upper portion 150 with a transition or extension portion 142 defined there between to connect the bottom portion 140 to the upper portion 150. Extension portion 142 is shown comprising an angled surface with respect to longitudinal axis 132.

The upper portion 150 is positioned above the bottom portion 140 and also can include a cylindrical or any other suitable shape, such as a square cross-section or the like. The upper portion 150 is sized and configured to include a length defined along the longitudinal axis and an upper width 154 defined laterally and orthogonally with respect to the longitudinal axis 132. The upper width 154 of the upper portion 150 is sized with a shorter dimension than the bottom width 144 of the bottom portion 140, thus creating a non-uniform cross-section along the length of the elongated portion 130. The extension portion 142 serves as the transition between the different widths of the upper portion 150 and bottom portion 140. Such extension portion 142 can include, but is not limited to, a conical shaped portion having a conical surface tapering from the bottom portion 140 to the upper portion 150. If impaling spike 120 comprises a square or rectangular cross-section, extension portion 142 will comprise various angled or tapered surfaces extending between upper portion 150 and lower portion 140.

The piercing end portion 160 tapers from the upper portion 150 to form a point 162. The point 162 can be a blunt point or a sharp point so long as the point 162 can penetrate the bread item 180. Such piercing end portion 160 can taper conically to the point 162 or include a single planar upward taper from one side of the upper portion 150 to the opposite side thereof. Other suitable shapes can also be utilized to form the piercing end portion 160 as known in the art to initialize forming the cavity 182. With this arrangement, the piercing end portion 160 of the elongated spike 130 is configured to impale a bread item 180 and be longitudinally inserted into the bread item 180 so that the entire spike 120 is disposed therein to form the cavity 182.

Referring again to FIGS. 1-3, as previously set forth, the bottom width 144 of the bottom portion 140 includes a greater lateral dimension than the upper portion 150 and, therefore, the bottom portion 140 forms a larger cavity portion than the cavity portion formed by the upper portion 150. Such larger cavity portion formed by the bottom portion 140 at least partially defines the condiment receiving channel 184 within the cavity 182 of the bread item 180. Depending upon the dimensions of the food item 186 inserted within the cavity 182, the condiment receiving channel 184 is defined by a volume space 185 surrounding the food item 186 within the cavity 182. Such volume space 185 can be an annular space surrounding the food item 186 or can include multiple space portions collectively comprising the volume space 185, which depends on the size and configuration of the bottom portion 140 of the spike 120 and of the inserted meat item. In this manner, the condiment receiving channel 184 provides additional space in the cavity 182 to insert various condiments around the food item 186 after the meat item has been inserted into the cavity 182. Such additional space foregoes the problem of a food-preparer having to position all the condiments within the cavity prior to inserting the meat item or, alternatively, having to squeeze condiments within the limited space between the surface of the cavity and the meat item, often resulting in smashing or tearing the bread item.

Figures 4, 5, 6:
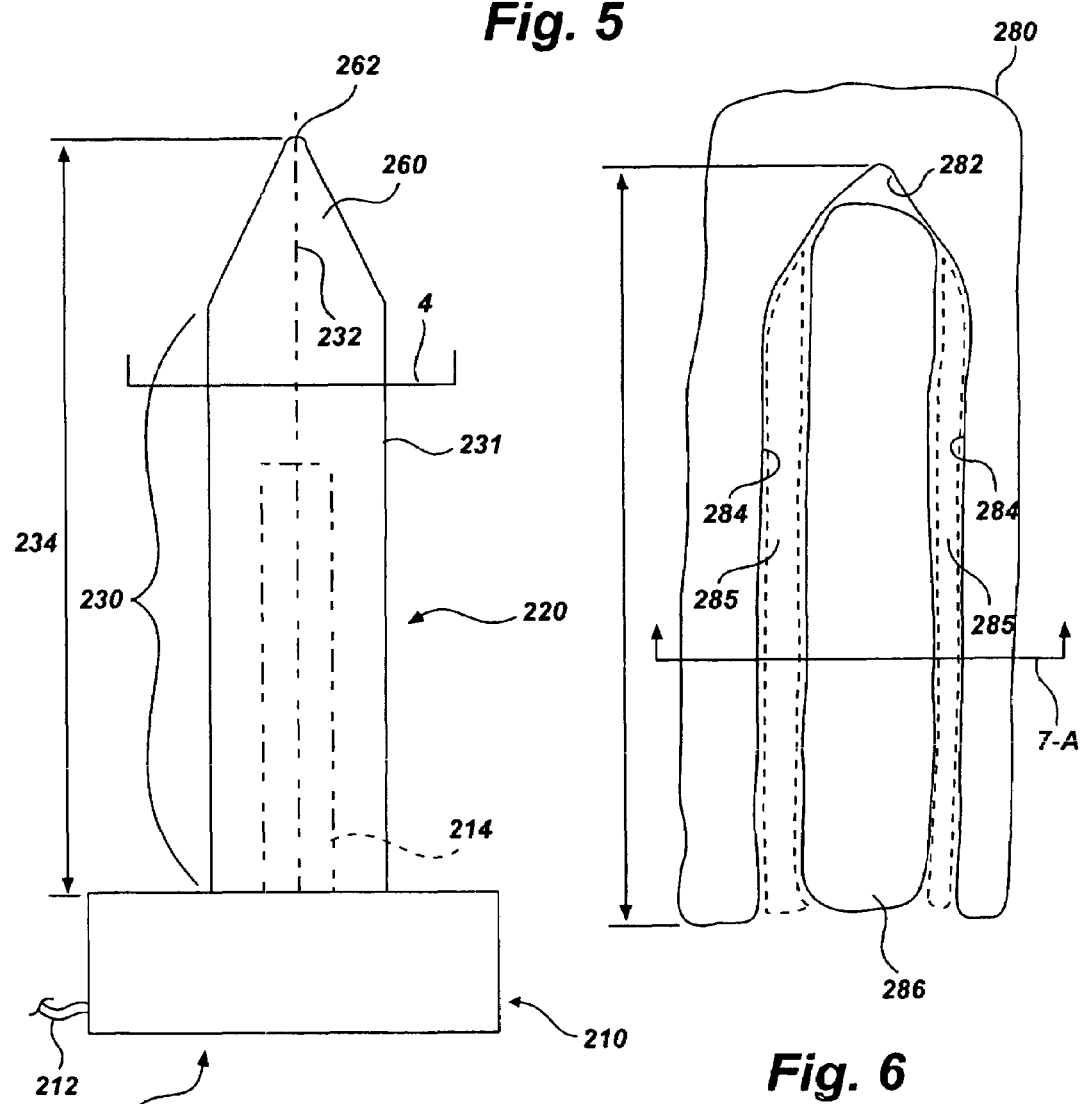
FIG. 4 illustrates a side view of another embodiment of the cooking utensil having a bread-impaling spike and a base member, depicting the base member having an electrical plug to directly heat the elongated spike with a heating element disposed in the spike.
FIG. 5 illustrates a cross-sectional view of the cooking utensil taken along line 5 in FIG. 4, depicting an elongated portion of the cooking utensil having a square cross-section.
FIG. 6 illustrates a cross-sectional view of the bread item having a cavity formed by the cooking utensil in FIG. 4, depicting the cavity including a condiment receiving channel (shown in outline) defined in the bread item and the cavity filled with the meat item with condiments in the condiment receiving channel.
Figure 7A:
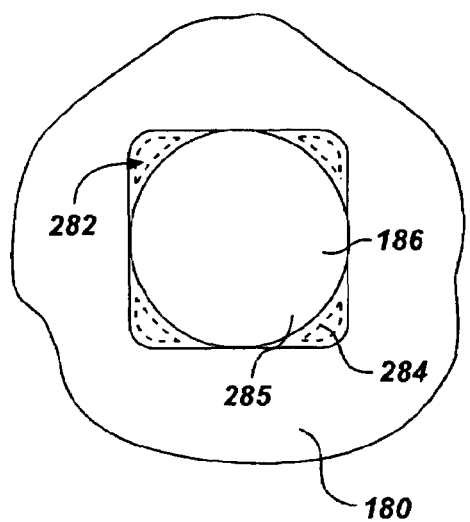
FIG. 7-A illustrates a cross-sectional view of the bread item taken along line 7 in FIG. 6, wherein the cavity comprises a square-cross section.
Figure 7B:
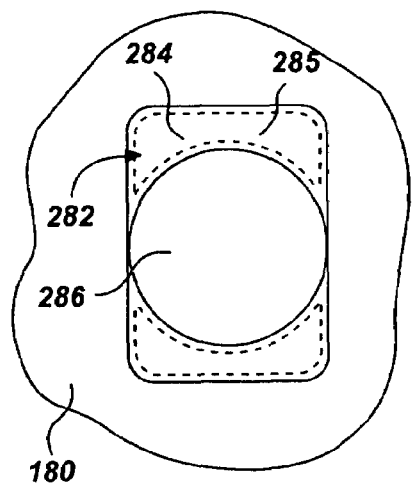
Figure 7C:
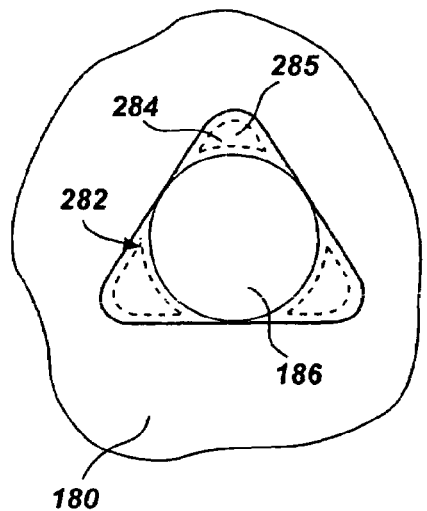
Figure 7D:
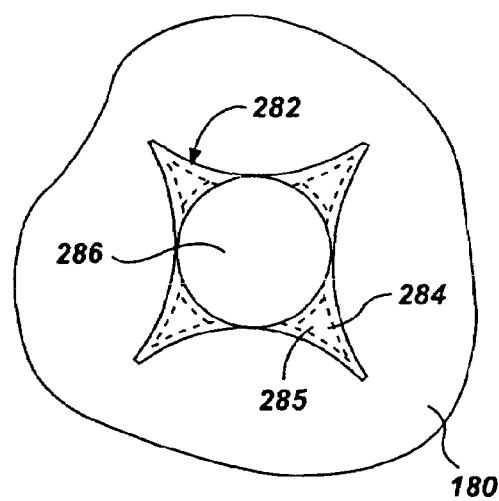
Figure 7E:
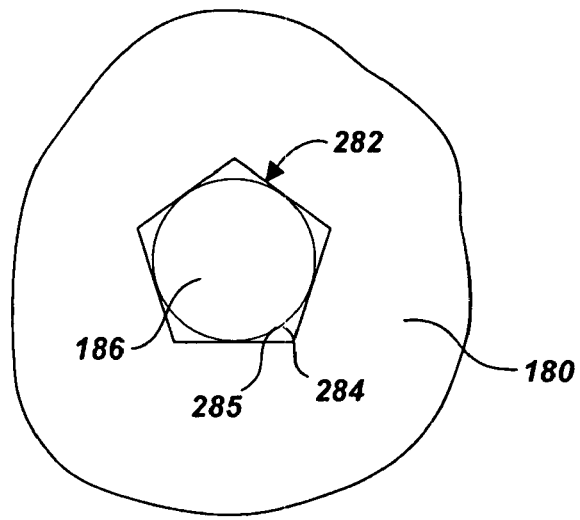
Figure 7F:
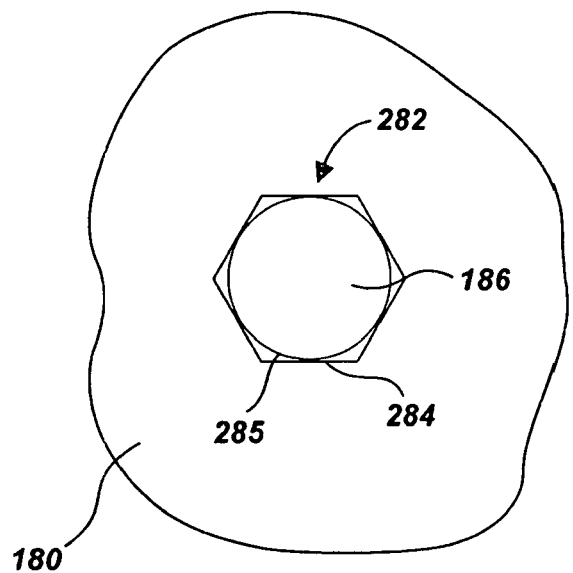
Figure 7G:
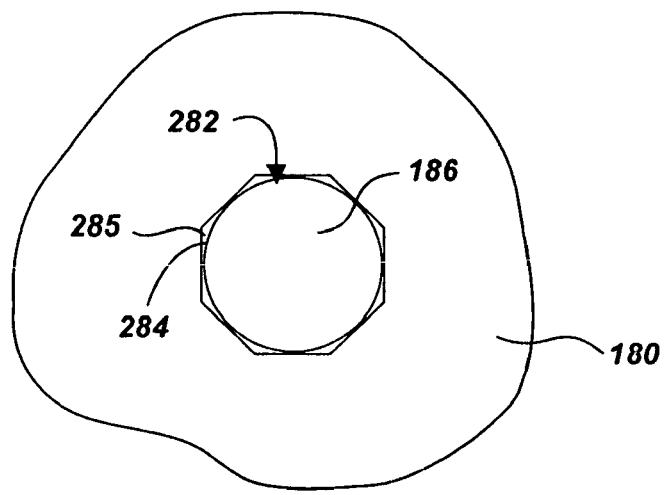

With respect to FIGS. 4 and 5, illustrated is another exemplary embodiment of a cooking utensil 200 having a bread-impaling spike 220 disposed on a base member 210. As shown, the spike 220 includes a longitudinal length 234 defining an elongated portion 230 comprising an equilateral surface configuration in the form of a quadrilateral or square cross-section. The bread-impaling spike 220 also comprises a piercing end portion 260. Similar to the previous embodiment, the piercing end portion 260 can include a taper extending from an end of the elongated portion 230 to a point 262. Although FIGS. 4 and 5 illustrate one exemplary embodiment of an equilateral elongated portion having a square cross-section, the bread-impaling spike 220 may comprise other equilateral cross-sectional geometric configurations, such as an equilateral triangular configuration. Examples of other equilateral configurations are shown in FIGS. 7-A, 7-C, and 7-D.

In an equilateral configuration, the bread impaling spike 220 may be defined as comprising equal and symmetric sides or surfaces that function to form the mirrored shape of the cavity within the bread item, as well as to create one or more condiment receiving channels 284 within the impaled cavity. The condiment receiving channels 284 are designed to be located at the intersection or junction of the various cavity sides or surfaces or walls making up the cavity of the impaled bread item as these junctions are generally not directly adjacent the inserted meat item. Stated differently, upon inserting a meat item, it is intended that the impaled cavity comprise a larger cross-sectional area than that of the meat item in order to create and define one or more volumes of space or pockets within the cavity when the meat item is disposed within the cavity. These volumes of space or pockets are located at the junction where the surfaces or walls of the cavity meet and are defined by a divergence of the cavity surfaces from the surfaces of the inserted meat item. As such, the condiment receiving channels may comprise the volume of space or pocket.

The bread-impaling spike 220 may comprise various other geometric configurations defined by at least two lengths. The at least two lengths defining the elongated portion 230 are comprised of a diagonal length 244 and a side lateral length 254 each extending through the longitudinal axis 232 of the bread-impaling spike 220. The diagonal length 244 is defined to extend in a diagonal manner with respect to the longitudinal axis between opposing corners of a cross-section of the elongated portion 230, such as between diagonally opposing first and second corners 246 and 248. The length and angle of the diagonal length 244 from the longitudinal axis will depend upon the cross-sectional shape of the elongated portion 230. Likewise, the side or lateral length 254 is defined to extend laterally and orthogonally with respect to the longitudinal axis 232, but between opposing sides of the elongated portion, such as between opposing first and second sides 256 and 258. With a square cross-section arrangement, the diagonal length 244 is inherently longer than the side length 254. Varying these two length allows several different cross-sectional shapes to be achieved, such as a square, rectangle, etc., some of which are illustrated in FIGS. 7-A-7-D.

With respect to FIGS. 7-A-7-G, the bread-impaling spike 220 may consist of several possible geometrically shaped cross-sections to create the corresponding cavities 282, and condiment receiving channels 284, in the bread item 180, as shown, and upon inserting a circular meat item 186 therein. Thus, in some embodiments, the bread-impaling spike 220 may instead be defined in terms of planes or planar segments positioned or formed with respect to each other and about or around the longitudinal axis of the bread-impaling spike 220, wherein the planar segments or surfaces are formed together to create a closed-form cross-sectional geometric shape. A closed-form geometric shape is defined herein as any geometric shape having planar segments or surfaces formed together at their ends (i.e., a junction) to create an enclosure (e.g., square, triangle, pentagon, hexagon, octagon, etc.). Since most meat items that will be used or inserted into the created cavity of the bread item will be circular in cross-section, it follows that to create various pockets or condiment receiving channels 284 for receiving condiments, the bread-impaling spike 220 should typically comprise a non-circular cross-section with the planar or surface segments creating corresponding cavity surfaces or walls. These cavity surfaces typically are oriented in a tangent or substantially tangent relationship with respect to the surface of the inserted meat item, but also diverge from the surface of the meat item a pre-determined or given distance to intersect with another cavity surface. This divergence and subsequent intersection functions to create a cavity or condiment receiving channel that consists of a pocket or volume of space configured to receive one or more condiments therein. For example, FIG. 7-A illustrates a cavity 282 created from a bread-impaling spike having a square cross-section, wherein four planar surfaces are formed together such that each planar segment diverges from the surface of the meat item 186 in opposite directions to intersect two other planar surfaces at right angles, or rather the ends of each planar segment are placed together at right angles, to form a square. Upon inserting the circular meat item 186, four condiment receiving channels 284 will be created and defined, one at each corner. FIG. 7-B illustrates a cavity 282 created from a bread-impaling spike having a rectangular cross-section, wherein four planar surfaces are formed together such that each planar segment intersects two other planar surfaces at right angles, or rather the ends of each planar segment are placed together at right angles. However, as in all rectangles, the opposing sides of the rectangle are of equal size, while their orthogonal counterparts comprise a different size, thus forming a rectangle, and thus having only two sides that are tangent or substantially tangent to and that diverge from the surface of said meat item. Upon inserting the circular meat item 186, two condiment receiving channels 284 will be created and defined, one at each longitudinal end. FIG. 7-C illustrates a cavity 282 created from a bread-impaling spike having a triangular cross-section, wherein three planar surfaces are formed together such that each planar segment intersects each of the other two planar segments to form a triangle. In this embodiment, the triangular segments are each tangential or substantially tangential to the meat item 186, and also diverge is opposing directions from the meat item 186. Upon inserting the circular meat item 186, three condiment receiving channels 284 will be created and defined, one at each apex of the triangle. FIGS. 7-E-7-G illustrate the bread impaling spike 220 as comprising still other available cross-sectional geometric configurations to create a corresponding cross-sectional shape in the bread item. Specifically, FIG. 7-E illustrates a cross-sectional view of the bread item, wherein the cavity comprises a pentagonal cross-section. FIG. 7-F illustrates a cross-sectional view of the bread item, wherein the cavity comprises a hexagonal cross-section. And, FIG. 7-G illustrates a cross-sectional view of the bread item, wherein the cavity comprises a octagonal cross-section.

In other aspects, some embodiments of the bread-impaling spike 282 do not comprise completely planar surfaces, but instead comprise, or the present invention further contemplates, one or more surface members of the bread-impaling spike being curved, as discussed below. For example, the bread-impaling spike 220 may comprise a cross-section that consists of circular or curved segments, such as the four curved segments formed together to create a cavity 282 as shown in FIG. 7-D. This configuration is similar to the square cross-section in that four condiment receiving channels 284 are created. The four created curved segments of the cavity 282 are tangential to the circular meat item 186.

Referring now to FIGS. 4-7-A, showing bread impaling spike 220 having a square cross-sectional geometry, the elongated portion 230 is operable to form the cavity 282 in the bread item 180, wherein the cavity 282 defines a plurality of condiment receiving channels 284 in the bread item 180. As in the previous embodiment, the condiment receiving channel 284 comprises an additional volume space or pocket 285 for easily receiving various condiments to surround the inserted food item 186 consistently along the length of the receiving channels 284. In this embodiment, the cavity 282 can be formed and toasted with the bread-impaling spike 220, after which, condiments can be disposed in the condiment receiving channel 284 prior to or after inserting the food item 186. The square cross-section configuration of the elongated portion 230 provides essentially four separate and distinct condiment pockets or condiment receiving channels 284 upon inserting a round meat item into the cavity 282. Moreover, as the cavities of the present invention are separated, the insertion of condiments is a much more efficient and clean process. Although it would be obvious to one skilled in the art, the elongated portion of the spike 220 can include different types of configurations, such as a triangular cross-section, thus defining three condiment receiving channels in the bread item (if inserting a round meat item).

In another embodiment of the present invention, the cooking utensil 200 can be a stand-alone heating unit. The base member 210 can include an insulated material with an electrical plug 212 extending therefrom. Such electrical plug is operatively coupled to a heating element 214 (shown in outline) disposed within a portion of the bread-impaling spike 220. The heating element is configured to directly conduct heat through the spike 220. In this manner, a food-preparer can readily insert the electrical plug 212 into an electrical outlet (not shown) to heat the bread-impaling spike 220 for forming a cavity and toasting the bread item as previously set forth. It should be noted that such cooking utensil 200 can include multiple bread-impaling spikes extending upward from the base member.

The present invention cooking utensil may further comprises an impaling system comprising a bread basket for receiving and supporting a bread item and a guide mechanism or system for guiding the bread basket and bread item over the bread-impaling spike. The bread basket is designed to be displaceable with respect to the bread-impaling spike and the guide system is designed to guide the bread basket and the contained bread item over the bread-impaling spike. Different embodiments of the impaling system are illustrated in FIGS. 8-17.

Figure 8:
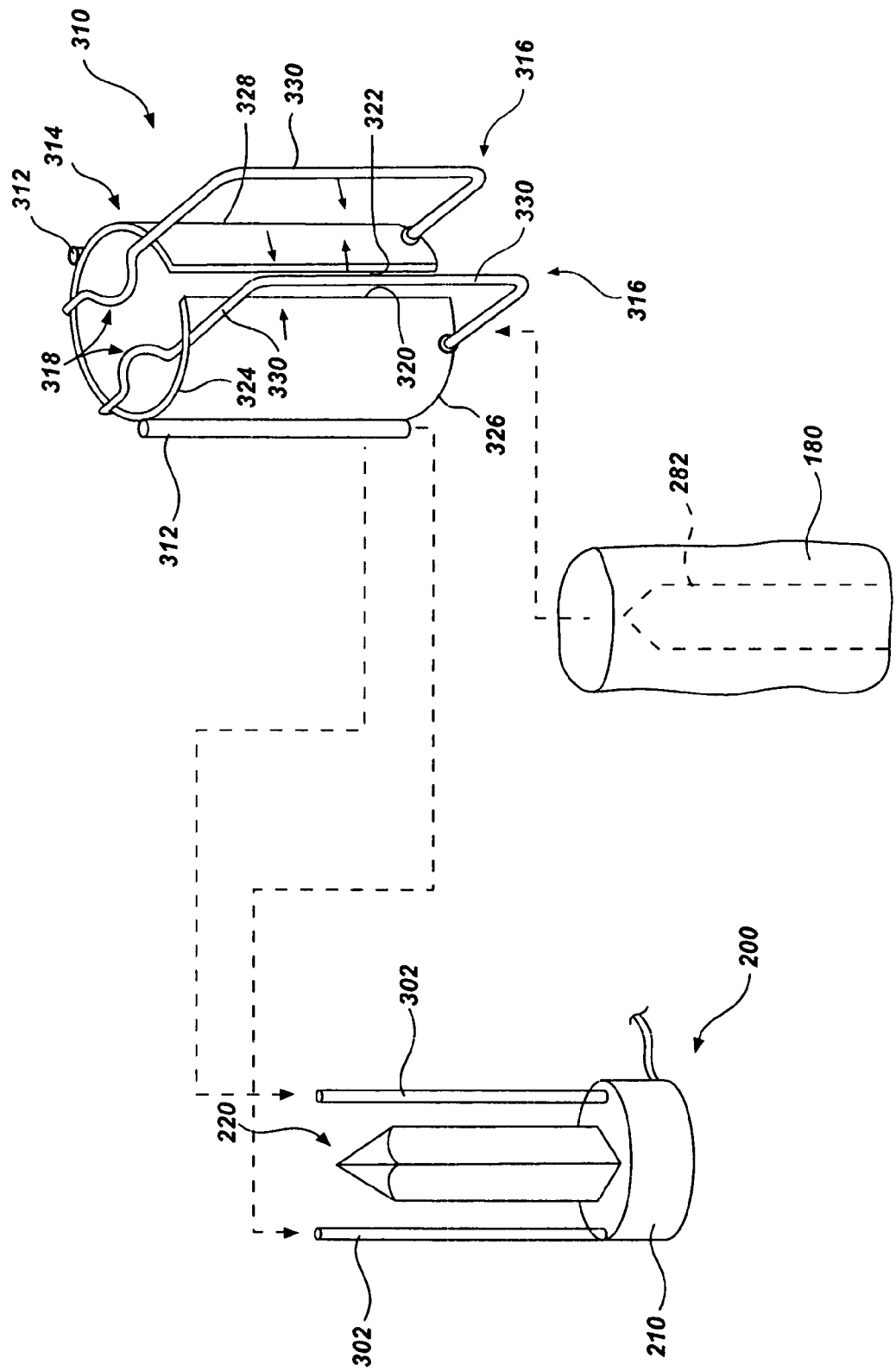
FIG. 8 illustrates a perspective view of the bread item insertable in a bread basket having guide receivers, depicting the guide receivers matable with elongated guides disposed vertically on the cooking utensil, according to another embodiment of the present invention.

In the exemplary embodiment shown in FIG. 8, the impaling system of cooking utensil 200 can include elongated guides 302 configured to guide a bread basket 310 holding the bread item 180 over the bread-impaling spike 220. Such elongated guides 302 can be formed integrally with or secured to the base member 210 or be disposed in a fixed position adjacent the spike 220. The elongated guides 302 can be elongated shafts and/or tubular members and can be configured to extend vertically upward adjacent to and spaced apart with respect to the bread-impaling spike 220.

Such elongated guides 302 are configured to receive and correspond with guide receivers 312 coupled to the bread basket 310.

The bread basket 310 can include an open-ended squeeze member 314 having a handle 316 with the guide receivers 312 coupled to the squeeze member 314. The squeeze member 314 can include a mesh configuration and/or a solid sheet configuration or a combination thereof made from a metallic material, such as steel, copper and aluminum or an alloy thereof. The squeeze member 314 can be formed from a planar material having a first end portion 320 and a second end portion 322 molded into a cylindrical shape so that the first and second end portions 320 and 322 are free-ends and are oppositely facing each other. The handle 316 can include various configurations, for example, the handle 316 can include two extensions 330 each with a U-shaped configuration and each coupled to a top portion 324 and a bottom portion 326 of the squeeze member 314 and configured to extend laterally from the squeeze member 314 to facilitate grasping the handle 316. More specifically, the two extensions 330 can be positioned so that one is disposed over the first end portion 320 and the other one is disposed over the second end portion 322. The U-shaped configuration of the two extensions 330 facilitate manually grasping and squeezing the handle 316 so that the opposing first and second end portions 320 and 322 of the squeeze member 314 move towards each other. As such, the bread item 180 can be positioned within the squeeze member 314 and the two extensions 230 of the handle 316 can be manually squeezed together so that the squeeze member 314 holds the bread item 180 therein.

The bread basket 310 can further include a support portion 318 configured to position and provide additional support to the bread item 180 to prevent the bread item 180 from sliding upward through the squeeze member 314 of the bread basket 310 when inserting the bread item 180 over the spike 220. Such support portion 318 can be positioned and coupled to the top portion 324 of the squeeze member 314. The support portion 318 can be a continuous extension from each of the two extensions 330 of the handle 316 or the support portion 318 can be formed separately from the handle 316. With this arrangement, the support portion 318 is disposed at the top portion 324 of the bread basket 310 to position and prevent the bread item 180 from moving upward while moving the bread item 180 over the spike 220 to form the cavity therein.

The bread basket 310 also includes the previously-mentioned guide receivers 312 to receive guides 302, thus facilitating the proper alignment of bread basket 310 with bread-impaling spike 220 to form a consistent the cavity 282 in the bread item 180. Such guide receivers 312 can be coupled to an outside surface 328 of the squeeze member 314 and configured to slidably mate with the elongated guides 302 disposed adjacent the spike 220. The guide receivers 312 can be configured to include elongated tubes and/or elongated shafts allowing them to receive and mate with the elongated guides 302. Although two elongated guides 302 and corresponding two guide receivers 312 are depicted, the present invention is not limited to such. For example, the bread basket 310 can be configured to include a single guide receiver to correspond to a single elongated guide disposed adjacent the spike, each of which can include a non-circular cross-section to prevent rotational movement between the single guide receiver and the single elongated guide. As such, the bread basket 310 can include one or more guide receivers to correspond to one or more elongated guides.

With the foregoing arrangement, a food-preparer can insert a bread item 180 into the bread basket 310 so that the bread item 180 is positioned within and surrounded by the squeeze member 314 and positioned against the support portions 318. The food-preparer can maintain the bread item 180 within the squeeze member 314 by clasping the handle 316 and squeezing the two extensions 330 toward each other. During this period, the spike 220 has been heated to a suitable temperature and is ready to receive the bread item 180 for forming the cavity 282. As such, with the bread item 180 held in the bun holder 310, the food-preparer can position the guide receivers 312 coupled to the bun holder 310 above the elongated guides 302 and then slide such guide receivers 312 over the elongated guides 302. As the guides 302 mate with guide receivers 312, the bread item 180 is pushed over the spike 220. The spike 220 penetrates the bread item 180, but does not mash the bread. Continually causing the spike 220 to penetrate into the bread item 180 resultantly creates or forms the cavity 282 therein. The size, configuration, and positioning of the bread basket 310 with respect to the similar size, configuration, and positioning of the spike 220 facilitates forming a consistent cavity 282 extending longitudinally into the bread item 180. The bread item 180 remains on the spike 220 with such bread basket 310 disposed there around until the bread item 180, and particularly the cavity 282, has been sufficiently toasted. The bread item 180 can then be removed by grasping the handle 316 to squeeze the bread item 180 and pulling upward on the bread basket 310 to release the guide receivers 312 from the guides 302, as well as to remover the spike 220 from the bread item 180. Once removed, the bread item 180 remains with a longitudinally formed cavity 282 therein, that is essentially the inverse of the spike 220. The function of the guide receivers 312 on the bread basket 310 prevents miss-centering the bread item 180 and also provides a safety element by shielding the food-preparer from the spike 220 when attempting to form the cavity 282 in the bread item 180.

With reference now to FIGS. 4-6, once the cavity 282 is formed in the bread item 180, such cavity 282 includes condiment receiving channels 284 defined in the cavity 282 of the bread item 180 due to the configuration of the elongated portion 230 of the spike 220. As previously described, such configuration is employed by having at least two different lengths in the elongated portion 230. As such, the food preparer can readily position condiments within such condiment receiving channels 284 along a substantial length of the cavity 282 along with the food item 186. As can be readily appreciated, such condiment receiving channels 284 provide additional volume spaces 285, each of which are defined by the substantially orthogonal edges formed in the bread item 180 in relation to the typically circular edge created by the food item 186. Condiment receiving channels 284 and volume of spaces 285 are separate and distinct from the space or cavity designed to receive the food item 186. The described configuration advantageously provides a food item with a more desirable and consistent taste throughout.

Figure 10:
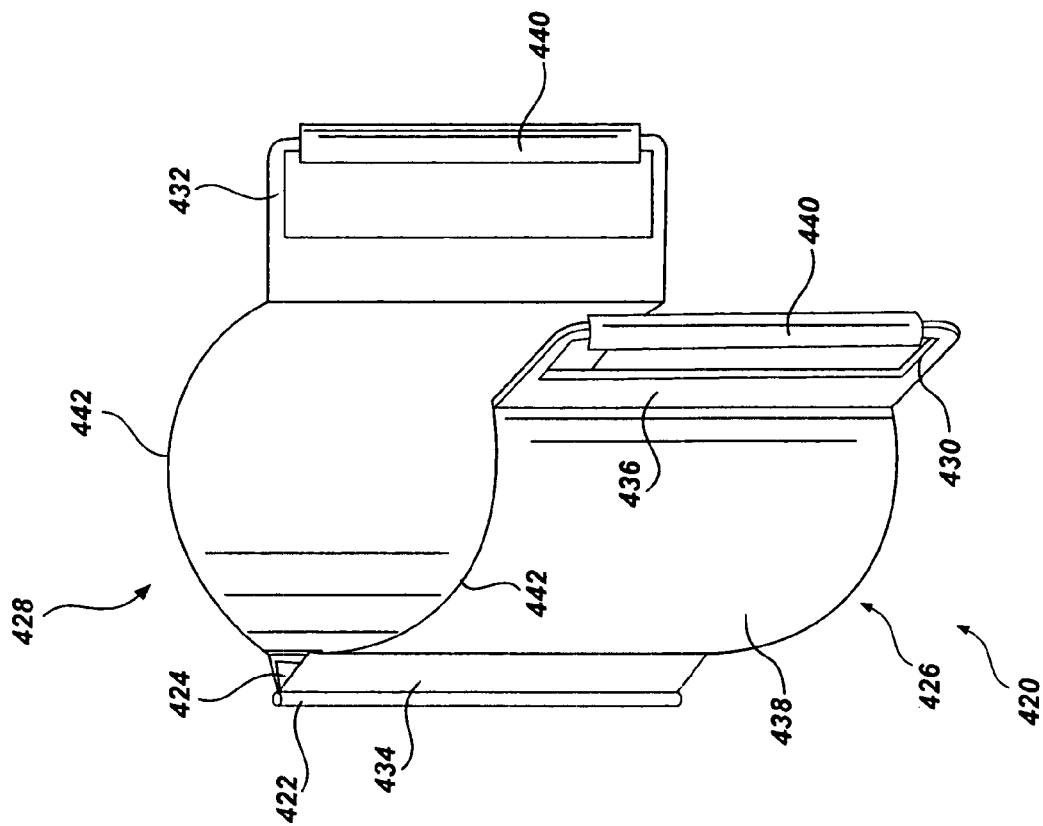
FIG. 10 illustrates a perspective view of a bread basket configured to hold a bread item (not shown) therein and configured to function with the cooking utensil depicted in FIG. 9.
Figure 9:
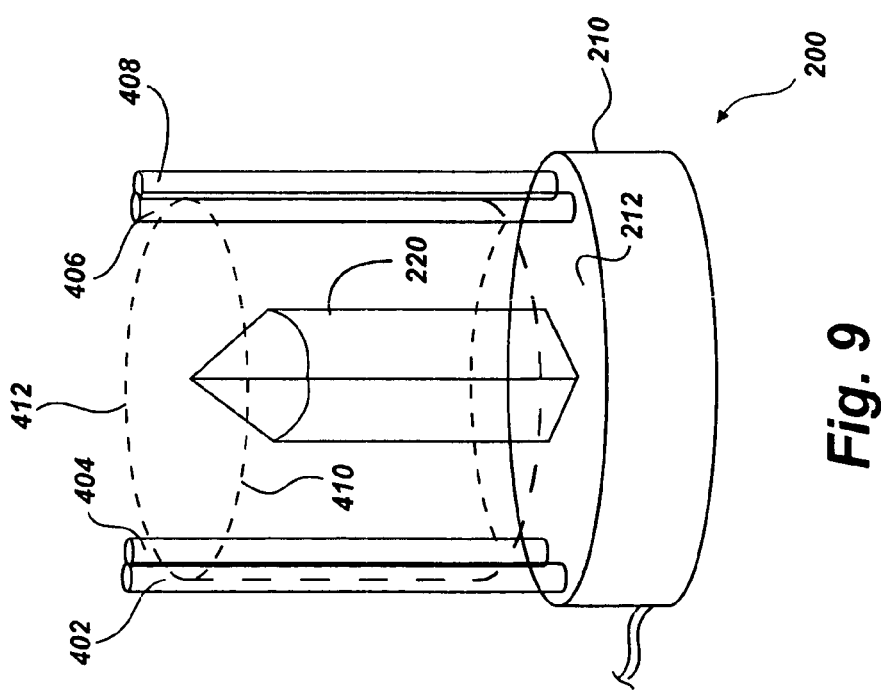
FIG. 9 illustrates a perspective view of the cooking utensil in FIG. 4, depicting the base member having vertical guide pins disposed adjacent the bread-impaling spike, according to another embodiment of the present invention.

With reference to FIGS. 9 and 10, another exemplary embodiment of the cooking utensil 200 and bread basket 420 is illustrated. In this embodiment, the base member 210 of the cooking utensil 200 includes guide pins disposed vertically adjacent the bread-impaling spike 220. In particular, first and second guide pins 402 and 404 and third and fourth guide pins 406 and 408 are symmetrically positioned and extend vertically from respective opposing sides of a top surface 212 of the base member 210 with the spike 220 centered there between. Each of the guide pins can be configured to be secured or coupled to the base member 210 in a fixed position using a type of fastening means commonly known in the art. For example, fastening means may comprise a bolt connection. Alternatively, guide pins may be formed integrally with the base member 210 in such a fixed position. The guide pins are preferably formed from a metallic material, such as, steel, aluminum, brass, or any other suitable material.

The guide pins can be coupled to a heat shield (shown in outline) configured to substantially reduce the potential of user contact with the heated spike 220. The heat shield can include a first heat shield 410 and a second heat shield 412. The first heat shield 410 is shown coupled to and extending from the first guide pin 402 to the third guide pin 406 with an outward radial curvature extending around and surrounding one side of the spike 220. Likewise, the second heat shield 412 is shown coupled to and extending from the second guide pin 404 to the fourth guide pin 408 with an outward radial curvature extending around and surrounding the other side of the spike 220. The first and second heat shields 410 and 412 can be coupled to the guide pins so that each heat shield sits suspended above the base member 210, thus facilitating airflow and the cleaning of the base member 410. Each of the heat shields 410 and 412 can be coupled to the guide pins in any suitable manner, such as by fastening, using a slot-fit arrangement, or by any other suitable manner as known in the art. Such a heat shield can be formed from any suitable metallic material, such as brass, aluminum, copper or steel, or any other suitable material to serve as a heat shield and to assist preventing human contact with the heated spike 220 from a lateral direction.

The bread basket 420 of this embodiment can include an elongated hinge 422 coupled between a first squeeze shield 426 and a second squeeze shield 428. Each of the first and second squeeze shields 426 and 428 can be formed from a planar material with a mesh configuration and/or a solid sheet configuration or a combination thereof. In addition, squeeze shields 426 and 428 may be formed from a metallic material, such as aluminum, copper, steel, or an alloy thereof. Each of the first and second squeeze shields 426 and 428 can be molded and formed from the planar material to include a front guide portion 434, a back guide portion 436 and a rounded portion 438 there between. The front guide portion 434 of each of the first and second squeeze shields 426 and 428 can be coupled to hinge extensions 424 extending from the elongated hinge 422. With this arrangement, the first and second squeeze shields 426 and 428 can pivot about the hinge in an open and closed position. The rounded portions 438 of each of the first and second squeeze shields 426 and 428 are configured to receive a bread item (not shown) in the open position and hold the bread item within the rounded portions 438 in the closed position. The back guide portions 436 of each of the first and second squeeze shields 426 include respective first and second handle members 430 and 432 extending outward therefrom. The first and second handle members 430 and 432 each can include a U-shaped configuration with grip portions 440 disposed at least partially around each U-shaped configuration.

Figure 11:
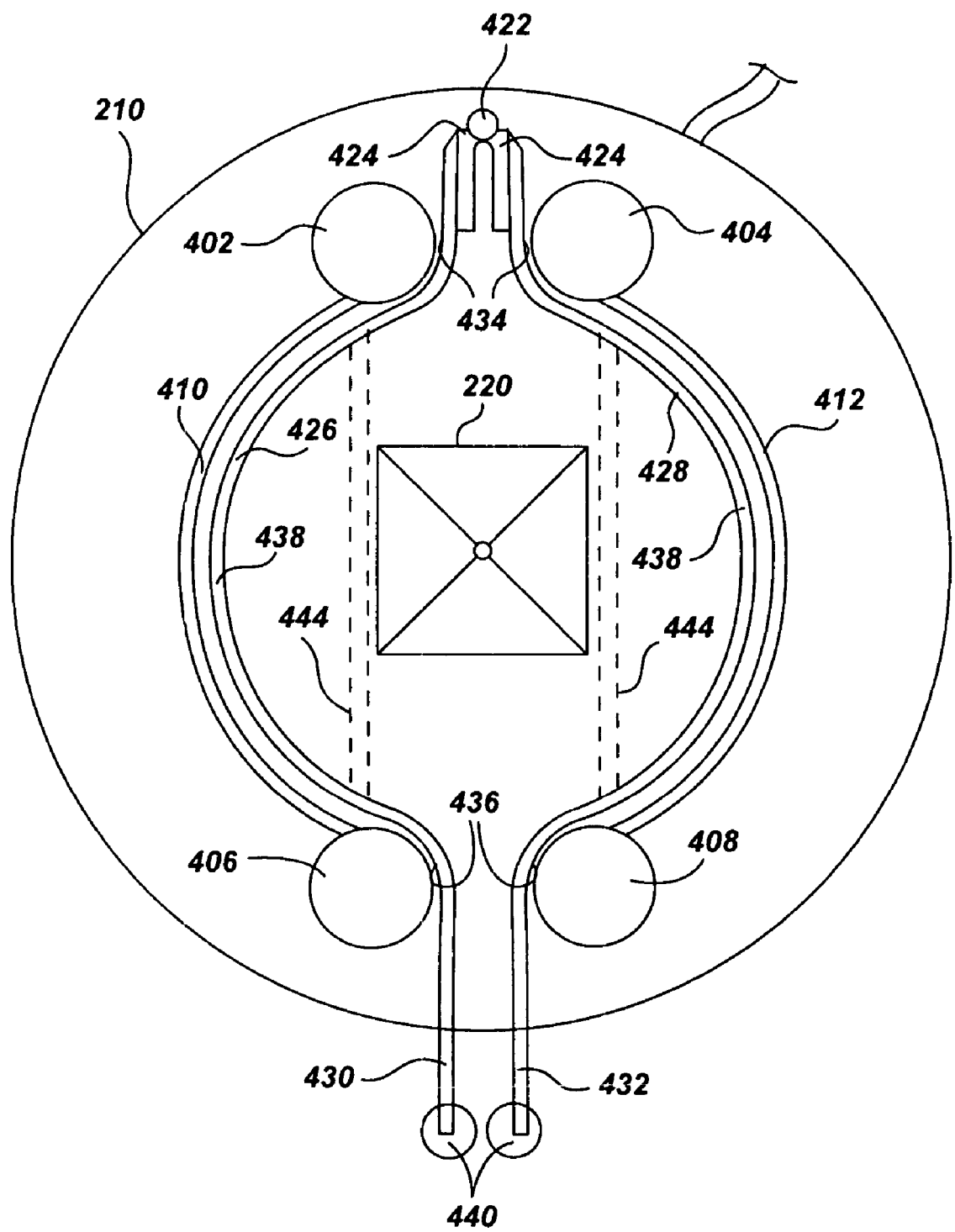
FIG. 11 illustrates a top view of the bread basket shown in FIG. 10 and the cooking utensil shown in FIG. 9, depicting the bread basket positioned between the vertical guide pins on the base member with the bread-impaling spike disposed in the center of the bread basket.

As depicted in the top view of FIG. 11, the bread basket 420 is configured to be guided between the first and second guide pins 402 and 404 and third and forth guide pins 406 and 408. In particular, with the bread basket 420 in the closed position, the front guide portions 434 are configured to slide between the first and second guide pins 402 and 404 and the back guide portions 436 are configured to slide between the third and fourth guide pins 406 and 408. As such, the rounded portion 438 of each of the first and second squeeze shields 426 and 428 is sized and configured to be concentrically disposed between the first and second heat shields 410 and 412. Each of the guide pins are spaced and positioned such that when the bread basket 420 is disposed there between as previously set forth, the bread-impaling spike 220 is positioned in the center of the rounded portions 438 of the bread basket 420. With this arrangement, the bread item (not shown) can be positioned within the rounded portions 438 so that when the bread basket 420 is pushed downward between the guide pins, as previously set forth, the spike 220 is centered with the bread item to form a centralized cavity therein.

The bread basket 420 can also include support portions 444 (shown in outline) configured to position and provide additional support in holding the bread item between the first and second squeeze shields 426 and 428 when pushing the bread item downward over the spike 220. Such support portions 444 can be coupled to a top portion 442 of the bread basket 420 and, more specifically, coupled to portions of the first and second squeeze shields 426 and 428.

Figure 12:
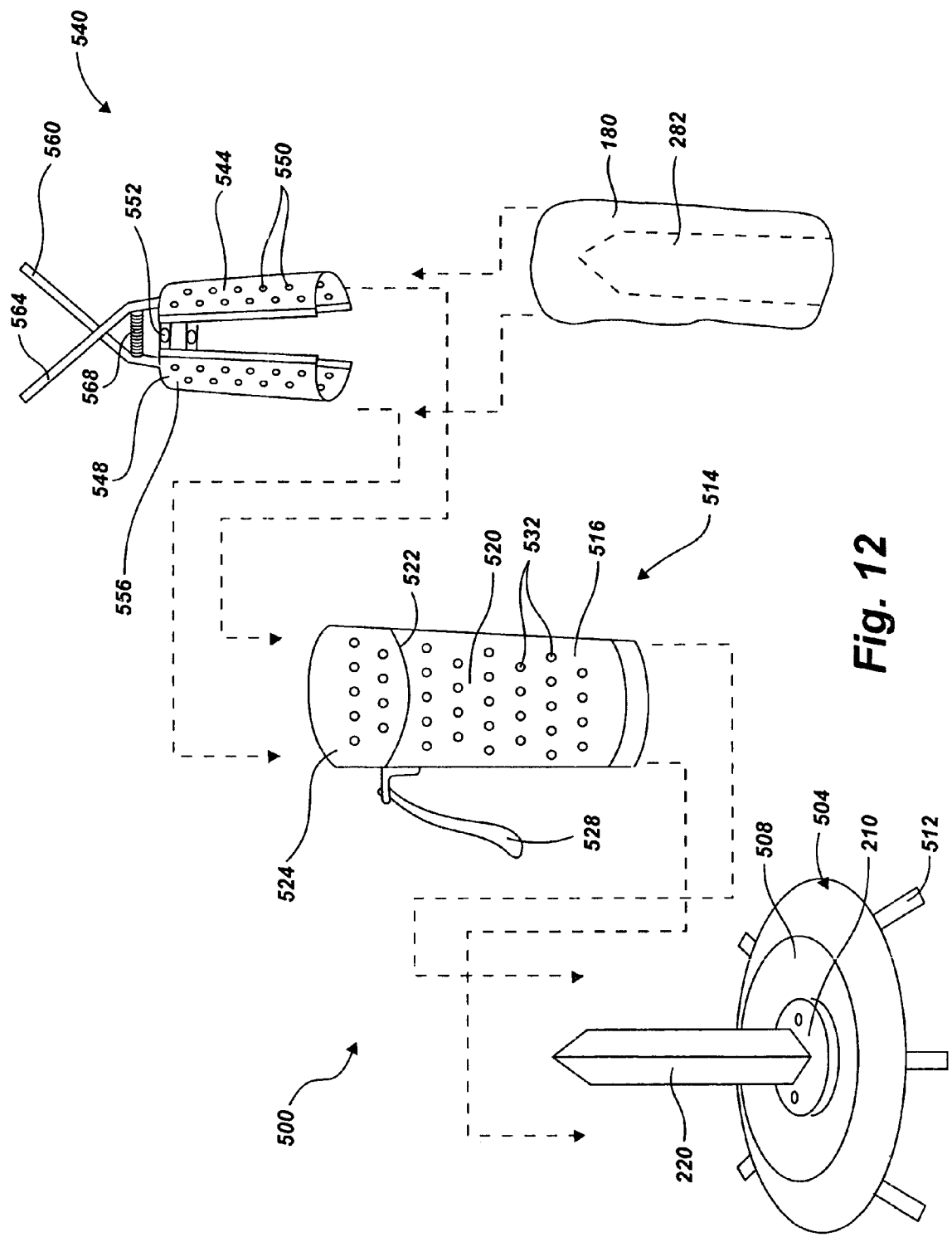
FIG. 12 illustrates a perspective view of the present invention cooking utensil according to another exemplary embodiment, wherein the cooking utensil comprises a concave base mount configured to fit over a stove element and a biased hinged bread basket insertable within a guide system.

Referring now to FIG. 12, shown is still another exemplary embodiment of the present invention bread impaling cooking utensil. In this embodiment, bread impaling cooking utensil 500 comprises a base mount 504 that may be concave, flat, or any other appropriate shape. In any event, the intended function of the base mount 504 is to be operable with a stove element, either gas or electric. FIG. 12 illustrates the base mount 504 as comprising a concave configuration. Specifically, the concave base mount 504 comprises a sloped perimeter portion 506 and a surface 508, wherein the base mount 504 is configured to fit over a stove element 512, wherein the stove functions as a heat source to heat the bread-impaling spike 220. Extending from the surface 508 of the concave base mount 504 is a base member 210 and a bread-impaling spike 220 similar to those discussed herein. The bread-impaling spike 220 may be fixed or removably coupled to the concave base mount 504. Moreover, the bread-impaling spike may further comprise a rod extending therefrom and through the surface 508 of the concave base mount 504, wherein the rod is configured to be in contact with or otherwise communicate with the stove element (either by contact with the element or with a flame produced by the stove element), thus functioning as a heat sink to heat the bread-impaling spike. The rod facilitates the transfer of heat from the stove element to the spike. Optionally, the concave base mount 504 may comprise a handle for facilitating its carrying and manipulation.

Cooking utensil 500 further comprises a guide system 514 for guiding a bread basket 540 over the bread-impaling spike 220. The guide system 514 comprises an open-ended thin-walled cylinder 516 having a sidewall 520 defining an enclosure for receiving the bread basket 540. The guide system 514 further comprises a wall extension 524 extending from the upper rim 522 of the sidewall 520. The wall extension 524 extends from substantially half of the rim portion 522 as shown. The wall extension 524 functions to facilitate the insertion of the bread basket 540 therein. Guide system 540 further functions as a heat shield to protect the user from the bread-impaling spike 220 during use.

Bread basket 540 comprises first and second plates 544 and 548 hinged together by hinge mechanism 552, thus allowing first and second plates 544 and 548 to pivot relative to one another for receiving a bread item therein, and for subsequently retaining the bread item in a fixed position. First and second plates are curved, thus substantially forming an open-ended cylinder when the bread basket is in a closed position. Moreover, first and second plates 544 and 548 comprise a plurality of vent spaces 550, as well as a plurality of protrusions 554 for creating a rough inner surface that helps to hold the bread item in place. Attached to at least one of the first and second plates 544 and 548 is a guide bar 556 that functions to contact the inner wall of the cylinder 516 and guide the bread basket 540 into place therein. The guide bar 556 also functions as a locating guide and provides the necessary clearance as the bread basket is inserted into the cylinder and onto the spike.

The bread basket 540 further comprises handles 560 and 564 attached to second and first plates 548 and 544, respectively. Handles 560 and 564 cross each other as shown and are biased in a way by biasing element 568 such that first and second plates are forced into an open position. To close the bread basket 540, the user simply squeezes the handles, thus overcoming the force from the biasing element and causing the first and second plates 544 and 548 to move together. At least one of the handles 560 and 564 may extend down the length of the first or second plates 544 and 548 to form the guide bar 556 discussed above. Preferably, however, both handles extend down each of the first and second plates 544 and 548, respectively, on opposing sides of the bread basket 540, thus facilitating the proper orientation and alignment of the bread basket within the cylinder 516.

In operation, the user inserts a bread item 180 into the interior of the open bread basket 540. The bread basket 540 is then closed by squeezing the handles 560 and 564, wherein the bread item 180 is securely retained within the bread basket. In its closed position, the bread basket 540 is inserted into the cylinder 516 of the guide system 514, wherein the guide bar(s) engage the wall extension 524 of the cylinder for easy insertion. Once inserted into the cylinder 516, the user grasps the handle 528 of the guide system (that is preferably positioned 90° from a centerline of the wall extension 524) and guides the entire assembly over the bread-impaling spike 220, wherein the guide system comes to rest upon the surface 508 of the concave base mount 504, which is placed over the stove 512. This action effectively impales the bread item 180 retained within the bread basket 540. Once the bread item 180 is impaled, the assembly is removed from the bread-impaling spike 220, the bread basket 540 is removed from the cylinder 514, and the bread item 180 is removed from the bread basket 540, thus revealing the cavity 282 formed therein. The foregoing steps are illustrated by the arrows in FIG. 12. This exemplary embodiment provides a simple and inexpensive device for impaling a bread item that will be attractive for use in the home.

Figure 13:
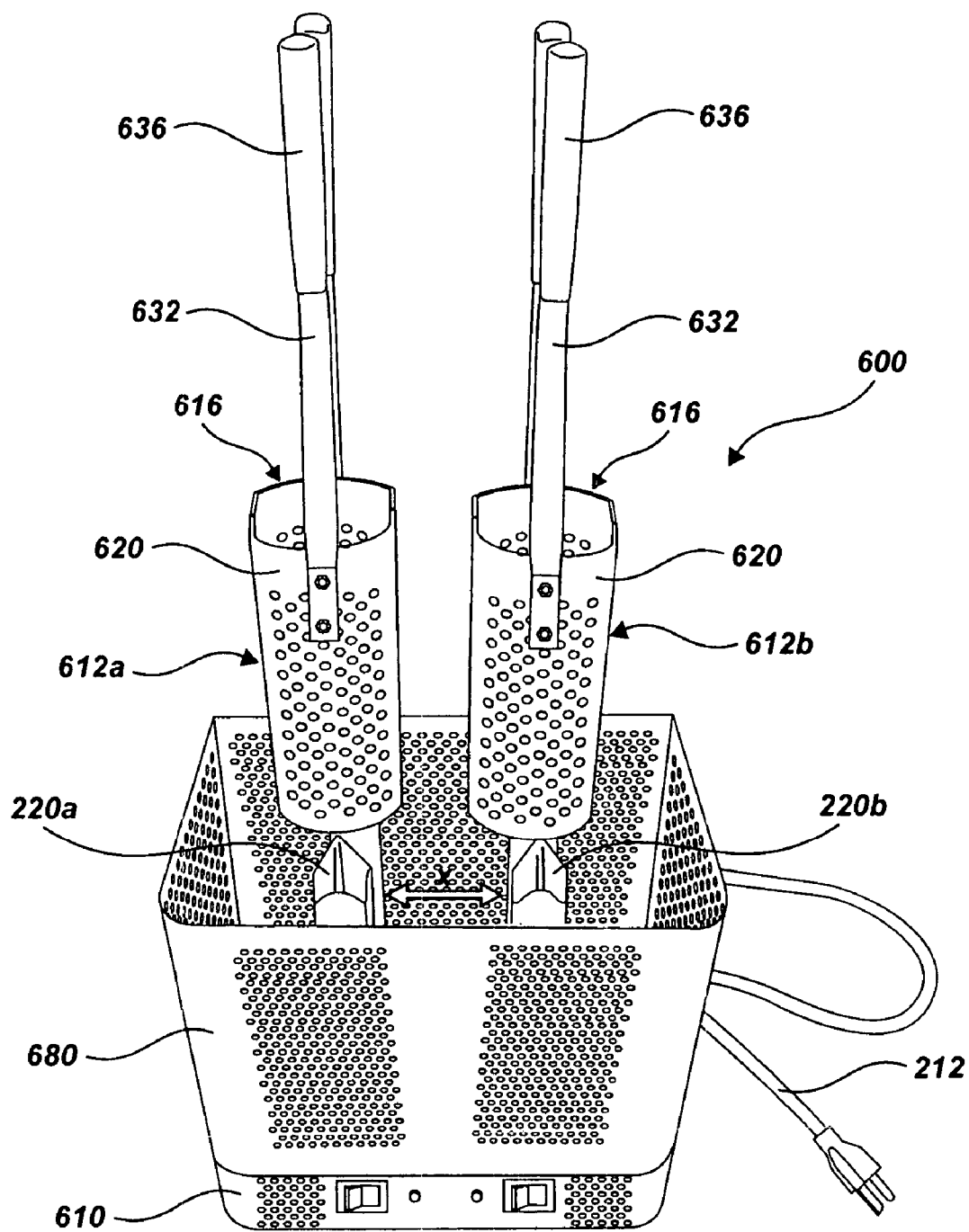
FIG. 13 illustrates a perspective view of the present invention cooking utensil according to another exemplary embodiment, wherein the cooking utensil comprises a hinged bread basket supported in a biased position over a bread-impaling spike by a guide rail containing the biasing and supporting elements.

Referring now to FIG. 13, shown is yet another exemplary embodiment of the present invention bread impaling cooking utensil. This embodiment is particularly suited for use within commercial environments, but may also be used in a non-commercial setting. As shown, bread impaling cooking utensil 600 comprises a base member 610. Coupled to the base member 610 are first and second bread-impaling spikes 220-A and 220-B. Base member 610 may comprise any number of bread-impaling spikes as will be obvious to one skilled in the art. In one aspect, first and second bread-impaling spikes 220-A and 220-B may be removably mounted to the base member 610, which in turn, may be removably mounted to a hot plate or some other suitable heat source as described above. In another aspect, base member 610 may comprise an insulated material having electrical plug 212 extending therefrom, wherein a heating element (see FIG. 4) is disposed within a portion of the bread-impaling spikes 220-A and 220-B, which heating element is configured to directly conduct heat through spikes 220, also as discussed above. In any event, the heat source operates to heat the bread-impaling spikes 220 to a temperature between 200° and 450° F. As such, the heated spikes 220 are configured to impale a bread item (not shown) and extend longitudinally into the bread item to form a cavity as discussed above, while also toasting a surface of the bread item within the created cavity.

The bread-impaling spikes 220 each define a longitudinal length, including an elongated portion with a tapered piercing end portion extending from an end of the elongated portion. In addition, the elongated portions include a square cross-section with an external surface having at least two different widths defined to extend laterally and orthogonally with respect to a longitudinal axis of the elongated portion. Each of the at least two different widths are further defined between opposing sides of the external surface through the longitudinal axis. As such, the elongated portions function to form a plurality of receiving channels within the created cavity, which condiment receiving channels may receive condiments or other food products therein. In the FIG. shown, spikes 220 are equivalent to the spike 220 illustrated in FIGS. 4-11 and discussed above. However, bread-impaling cooking utensil 600 may comprise a plurality of spikes configured similar to the one shown in FIG. 1, or of any of the alternative shapes discussed above (e.g., one with a triangular cross-section, etc.). In all respects, spikes 220-A and 220-B comprise similar characteristics as that of, are similar to, and function as spikes 120 or 220 discussed above, depending upon which type is employed.

Figure 14:
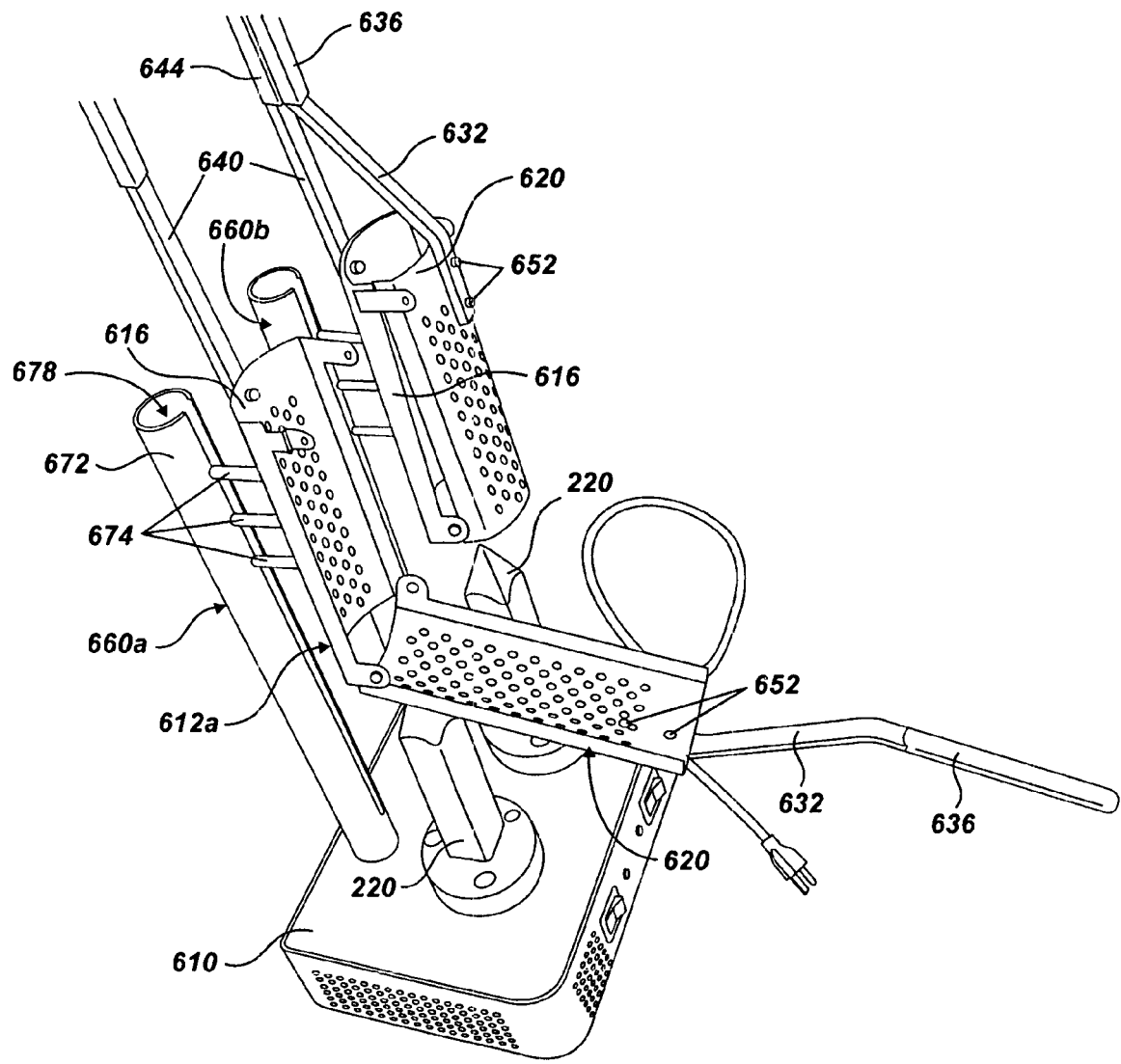
FIG. 14 illustrates a perspective view of the embodiment of FIG. 13, wherein the bread basket is in an opened position and the heat shield removed.
Figure 15:
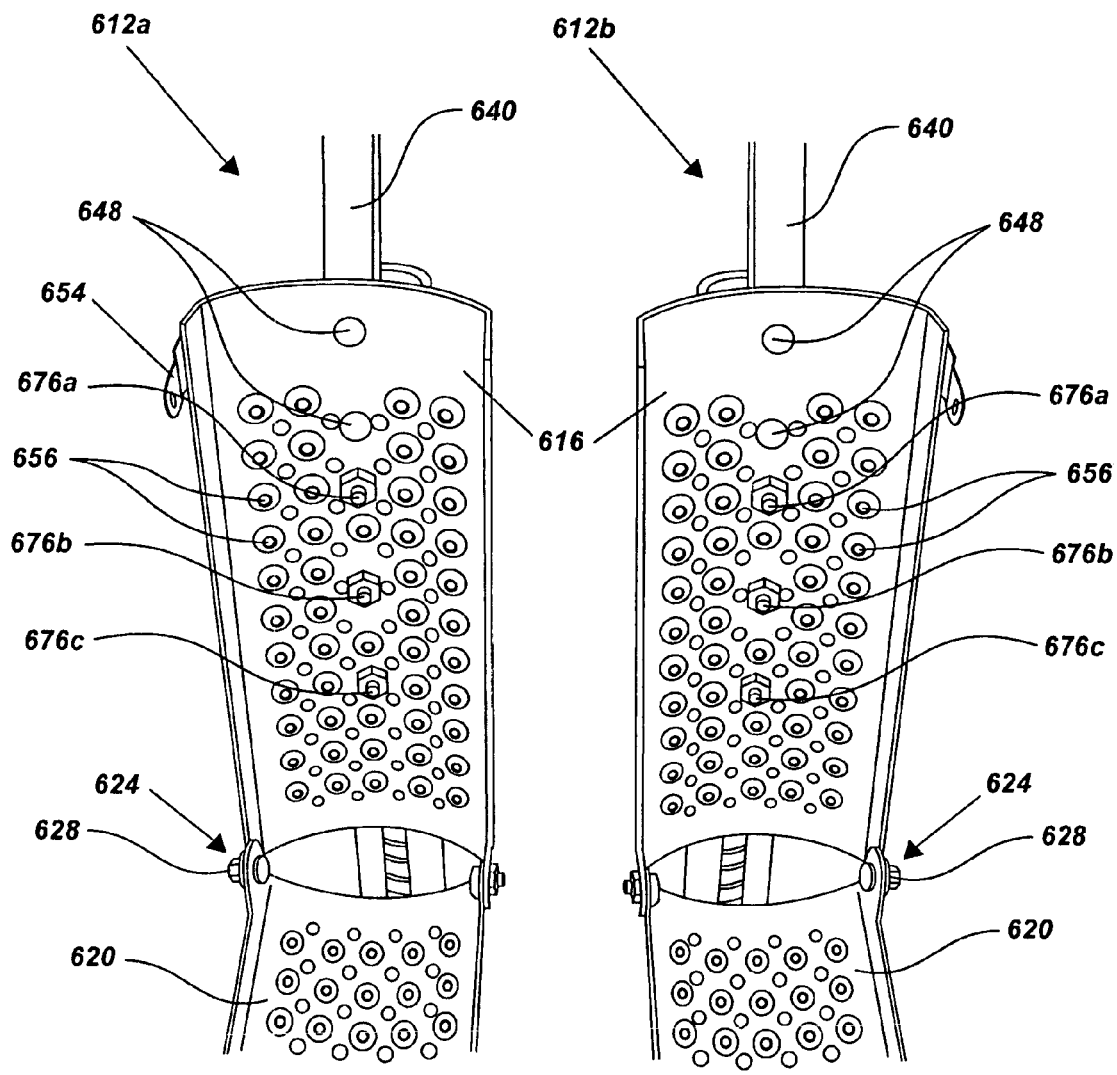
FIG. 15 illustrates a detailed view of the interior surfaces of the components making up the bread basket depicted in FIG. 13

With reference to FIGS. 13-15, the bread impaling cooking utensil 600 further comprises first and second bread baskets 612-A and 612-B, which are similar in form and function and will be described having like numerals designating like parts. Specifically, the bread baskets 612 each comprise an open bottom and an enclosure defined by a first plate 616 and a second plate 620 hinged together by hinge mechanism 624, shown as a common bolt hinge connection. The hinged connection 624 may comprise any known type of hinge system operable with the present invention that allows the first and second plates 616 and 620 to pivot relative to one another about pivot point 628. In one aspect, as shown, the first plate 616 is coupled to the support rail 660 via the rods 674 using any known attachment means, such as bolt connections 676-a, 676-b, and 676-c, respectively.

The second plate 620 is shown as the dynamic or pivoting plate that pivots between and open and closed position since the first plate 616 is essentially fixed, in that it is coupled to the support rail 660. In this configuration, the second plate 620 pivots downward from a closed position configured to secure the bread item within the bread basket 612 during the process lowering the bread basket 612 down over the spike 220 to create a cavity within the bread item to an open position for initially receiving a bread item into the bread basket 612. Of course, first and second plates may be made to pivot in a manner wherein the second plate 620 pivots upward from a hinged mechanism attached along the tops of the first and second plates 616 and 620. In any event, the first plate 616 is designed to be oriented in a substantially vertical position as coupled to the support rail 660. Similarly, the second plate 620 is also designed to be oriented in a substantially vertical position when the bread basket 612 is in a closed position.

The first and second plates 616 and 620 may each comprise any given shape. However, in order to best accommodate a bread item, first and second plates 616 and 620 each comprise a radius of curvature to accommodate or match the curvature often found in various bread items. As such, once in its closed position, the bread basket 612 effectively creates a substantially cylindrical enclosure that securely retains a bread item therein without damaging or deforming the bread item.

First and second plates 616 and 620 are shown further comprising a plurality of protrusions 656 formed thereon. Protrusions 656 are shown as including apertures therethrough, but may be solid in nature. Protrusions 656 are also shown interspaced between a plurality of air vents. Protrusions 656 are configured to extend from the inner wall of each of the first and second plates 616 and 620 and inward toward the interior of the bread basket (when in a closed position). These protrusions perform two functions. First, if also including apertures therethrough, they function as air vents similar to their non-protruding air vent counterparts. Second, and more importantly, they create a bumpy or rough bread contacting surface, thereby increasing the retaining ability or grip of the bread basket 612. Upon receiving a bread item within and closing the bread basket 612, protrusions 656 function to reduce the potential for inadvertent or undesirable slippage of the bread item, especially during penetration of the spike 220 into the bread item to create the cavity 282. The protrusions 656 may comprise any number and may be positioned anywhere along either or both of the interior surfaces of the first and second plates 616 and 620.

The bread baskets 612-A and 612-B also comprise handles for facilitating the opening and closing of the second plate 620, and also for facilitating the displacement of the bread baskets 612. Specifically, each of bread baskets 612-A and 612-B have coupled to their respective first plates 616 a handle 640. Handle 640 extends outwardly and vertically from the top of the first plate 616 and attaches to the first plate 616 using any known means, such as screw connection 648. Handle 640 further comprises a grip 644. Second plate 620 comprises a similar handle 632 and an associated grip 636. Handle 632 is coupled to the second plate 620 using a similar screw connection 652, but instead of existing in a single plane as handle 640, handle 632 comprises a series of bends with the first bend orienting towards the interior portion of the bread basket 612 and the second bend orienting in the vertical once again. Thus, in a closed position grip 636 is substantially adjacent and parallel to grip 644 of handle 640. The configuration of handle 632 with respect to handle 640 is best illustrated in FIG. 14. Of course, handles 632 and 640 may comprise any curved or multi-planar configuration, any of which will be obvious to one skilled in the art.

The bread baskets 612-A and 612-B further comprise latching means for latching first plate 616 to second plate 620. The latching means may be any type of system or device known in the art to secure two hinged components in a closed position. In one aspect, latching means comprises an extension piece 65 extending from first plate 616 as shown. Extension piece 654 is comprised of a thin metal material that may or may not comprise a lip. The extension piece, due to its cantilevered attachment and slight flexibility, functions to firmly engage an outer surface of the second plate 620 or a similar extension piece extending from second plate 620. Thus engaged, the extension piece 654 is slightly displaced such that, upon closing the second plate 620, extension piece 654 secures the second plate 620 to the first plate 616 by applying a tension thereto. In another aspect, latching means may comprise simple aligning apertures, one existing on each of first and second plates 616 and 620, through which an object may be placed once aligned. Indeed, there are numerous latching means available in the art, all of which are not specifically described herein, but which are nonetheless intended to be included.

Figure 16:
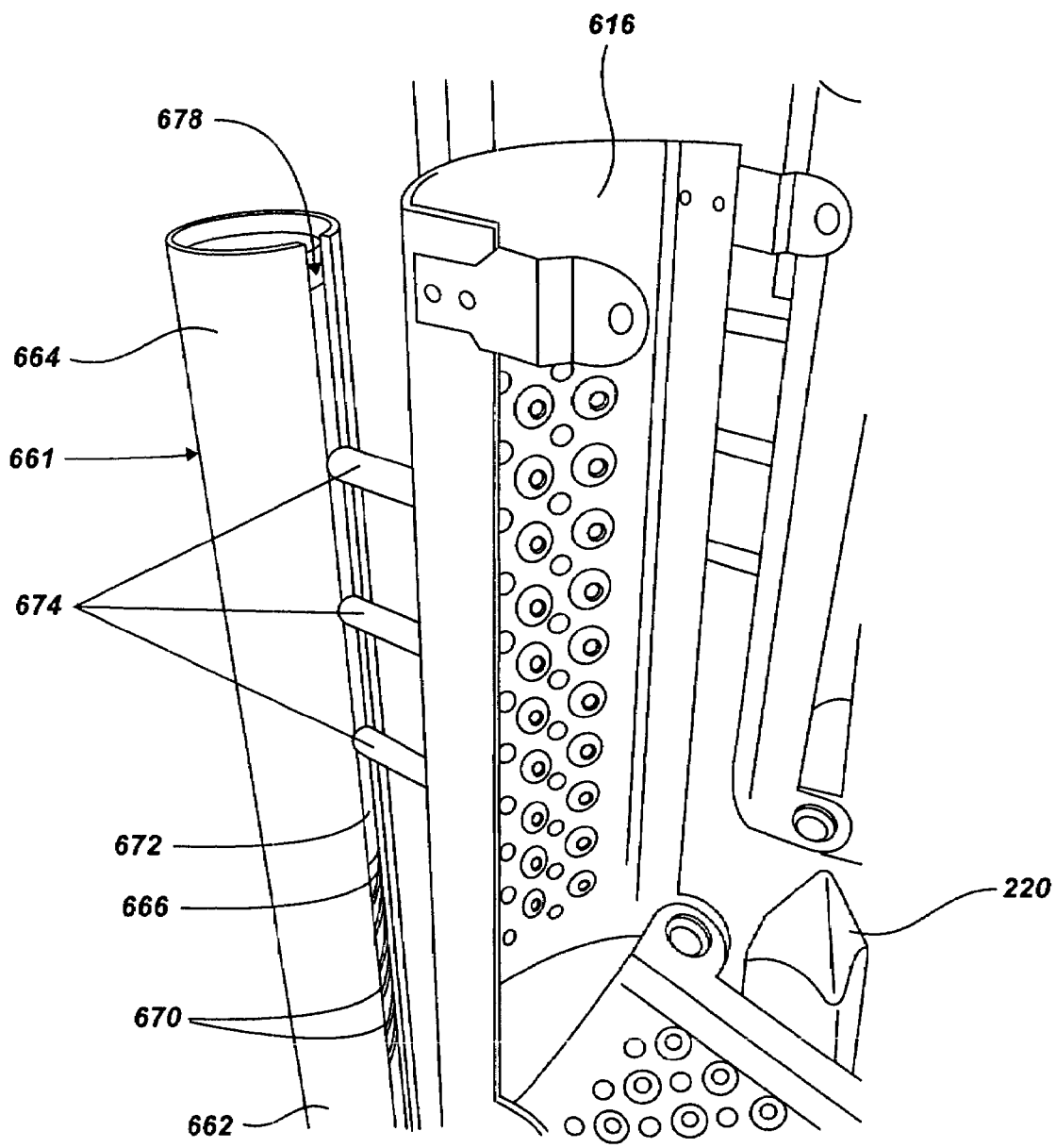
FIG. 16 illustrates a detailed view of the support assembly of the embodiment depicted in FIG. 13.
Figure 17:
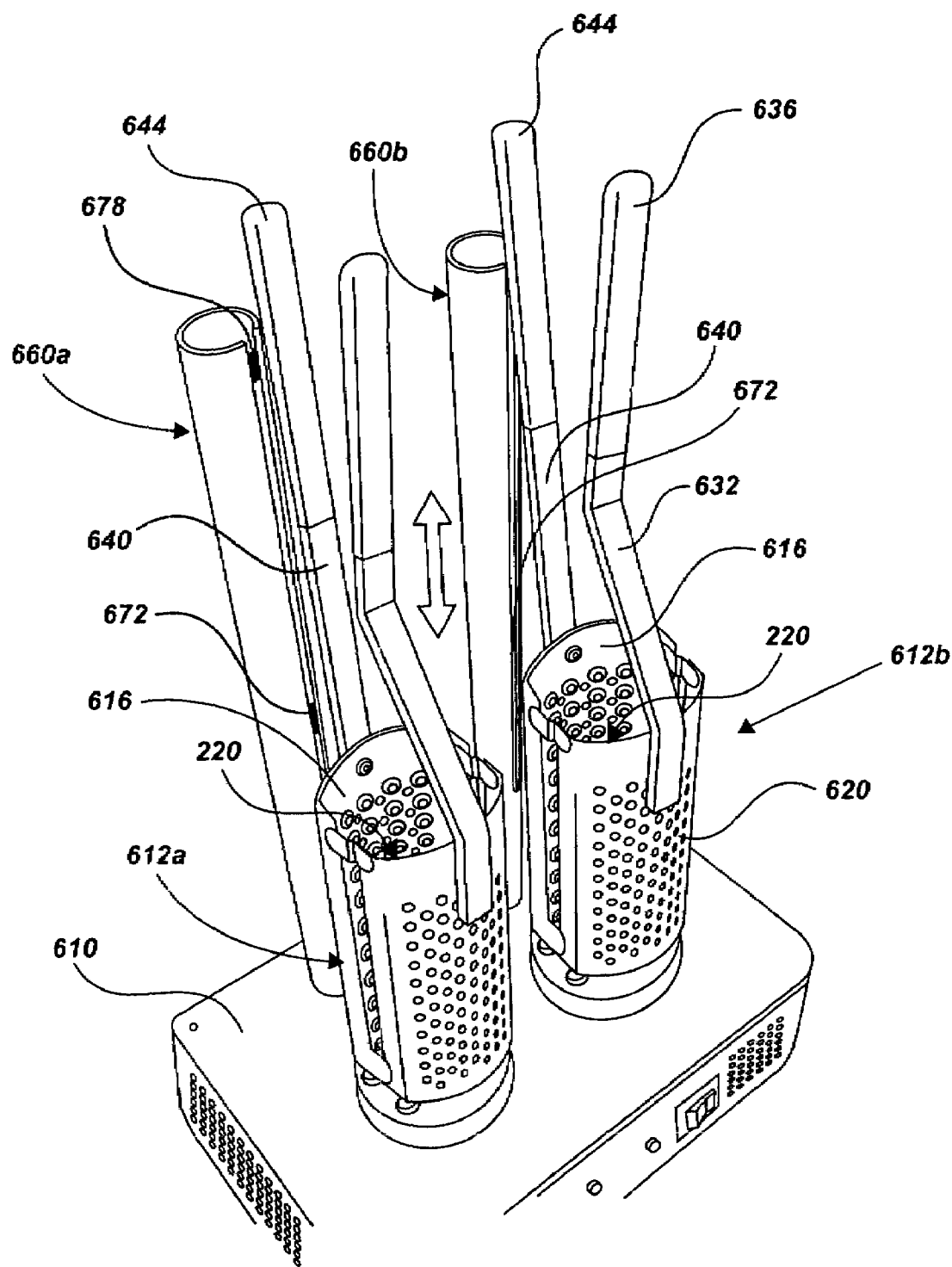
FIG. 17 illustrates a perspective view of the embodiment depicted in FIG. 13, wherein the bread baskets are lowered over the bread-impaling spike.

With reference to FIGS. 14, and 16-17, spikes 220-A and 220-B are positioned a distance x apart from each other to allow proper operation of cooking utensil 600, and particularly bread baskets 612-A and 612-B. Coupled to and extending from base 610 are first and second support rails 660-A and 660-B that function to support each of the bread baskets 612-A and 612-B, respectively, as discussed below. Support rails 660-A and 660-B are similar in form and function and will be described having like numerals designating like parts. Support rails 660-A and 660-B each comprise an elongated thin-wall cylinder 661 having a bottom end 662 coupled to base 610 and extending up a substantial distance to comprise an upper end 664. Formed within the cylinder 661 is slot 666. Slot 666 may be made to extend at least a portion of the entire length of cylinder 661. Slot 666 is cut formed out of the thin-wall of cylinder 661 and comprises a pre-determined width. Cylinder 661 is constructed of metal material, preferably stainless steel.

Support rails 660-A and 660-B each comprise a slide mechanism of one form or another for slidably supporting bread supports 612-A and 612-B, respectively. In one exemplary aspect, embedded or seated within cylinder 661 is a biasing member shown as spring 670. Spring 670 is seated against base member 610 on one side and a sleeve 672 on the other. Spring 670 functions to bias sleeve 672 that is slidably contained within the thin-wall cylinder 661. Extending laterally outward from sleeve 672 is at least one rod 674. The embodiment shown comprises three rods. The rods 674 function to securely couple the bread basket 612 to the support rail 660. The rods 674 are coupled to the sleeve 672 at a first end and to the bread basket 612 at an opposing end using attachment means 676. The rods 674 comprise a sufficient length such that the bread basket 612 is centrally positioned over and in-line with a spike 220 when viewed down the longitudinal axis of the spike 220. In other words, the bread basket 612 is supported by the rods 674 so that the spike 220 is centrally aligned within the enclosure created by the bread basket 612 when in a closed position.

The sleeve 672 may be made out of any material, but is preferably made out of a thermoplastic material, such as Delrin®, capable of withstanding the heat generated in the support rails 660. Indeed, since the support rails 660 are made of a metal material and coupled to the base member 610, they effectively act as a heat sink.

In operation, as the bread basket 612 is coupled to the sleeve 672, the bread basket 612 is allowed to displace in a bi-directional manner along a vertical path as shown in FIG. 17. Specifically, the spring 670 naturally forces the sleeve 672 upward until the sleeve 672 contacts the stopper 678 that is securely contained within the upper end 664 of the cylinder 661. The stopper is also made of a thermo-plastic or similar heat withstanding material. With the sleeve 672 in this position abutting the stopper 678, the bread basket 612 is in its uppermost and resting position. From here, the bread basket 612 may be displaced. To displace it, a downward force (e.g., supplied either manually or via an electromechanical system) is applied to the bread baskets 612, which causes the sleeve 672 to slide downward within the cylinder 661, thus compressing the spring 670. The slotted portion 666 formed within the cylinder 661 provides a track for the rods 674 to follow. The slotted portion 666 further prohibits rotation of the sleeve 672, and subsequently the bread basket 612, so that movement of the bread basket 612 is strictly linear. As the bread basket 612 is displaced, it is brought down over the spike 220 until the bread basket 612 contacts the base of the spike 220. Once fully displaced, the spike 220 is substantially concentrically positioned within the enclosure created by the bread basket 612. When a bread item is loaded into and retained within the bread basket 612, displacing the bread basket 612 and bringing it down over the spike 220 effectively causes the spike 220 to penetrate the bread item, thereby creating a cavity within the bread item similar to the cavity discussed above. Once the cavity in the bread item is formed and the inside of the cavity sufficiently toasted, the pressure on the bread basket 612 is released, thus allowing the spring 670 to release the bread basket 612, and particularly the bread item, from the spike 220 and to return the bread basket 612 to its initial resting position where the bread item with its newly formed cavity can be removed and a new bread item inserted, wherein the process repeats.

It will be apparent to one skilled in the art that the foregoing discussion and associated exemplary embodiments on providing a biased bread basket is merely representative of one structural configuration. The present invention contemplates in its highest level of abstraction any device or system capable of supporting a bread basket above a bread impaling spike, wherein the device or system may be actuated to allow the bread basket to descend down onto the spike to form a cavity in the bread item contained within the bread basket. The present invention also contemplates various horizontally or diagonally configured systems that displace a supported bread basket in a horizontal or diagonal plane, respectively, over a similarly oriented bread impaling spike.

The bread impaling cooking utensil 600 further comprises a removable heat shield 680 that encloses the spikes 220-A and 220-B, as well as the bread baskets 612-A and 612-B when engaged with the spikes 220-A and 220-B, respectively, to reduce the likelihood or potential of user contact with the heated spikes 220. The heat shield 680 comprises a generally square or rectangular configuration with an open top to allow the bread baskets 612-A and 612-B to descend therein, as well as an open bottom allowing the heat shield 680 to be removed. The height of the heat shield 680 is such that its uppermost edge is slightly above that of the spikes 220. Moreover, the heat shield 680 may be removably attached to the base member 610 using any known means, such as using a slot-fit arrangement, or by any other suitable manner as known in the art. The heat shield 680 may be formed from any suitable metallic material, such as brass, aluminum, copper or steel, or any other material suitable to serve as a heat shield and to reduce the likelihood of human contact with the heated spikes 220.

Although the embodiment shown in FIGS. 13-17 is specifically described, it will be obvious to one skilled in the art that other means for supporting a bread basket in a suspended and biased position above the bread-impaling spike (s) are contemplated. As such, the aspects of this embodiment are not intended to be limiting in any way. Indeed, the means for supporting may comprise a single supported bread basket, or a different support configuration or mechanism other than the one shown.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. Accordingly, the scope of the invention should be determined solely by the appended claims and their legal equivalents, rather than by the descriptions and examples given above.

What is claimed and desired to be secured by Letters Patent is:

1. A cooking utensil comprising:
    a base member;
    at least one bread-impaling spike coupled to and extending from said base member, said impaling spike comprising an elongated body portion and a piercing end portion for forming a cavity within a bread item, said elongated body portion comprises a plurality of planar surfaces formed together about and around a longitudinal axis to create a closed-form cross-sectional geometric shape configured to form at least one condiment receiving channel within said cavity of said bread item upon inserting a meat item;
    an impaling system comprising:
        a bread basket displaceable with respect to said bread-impaling spike and configured to receive and support said bread item therein; and
        a guide system operable with said bread basket for aligning said bread basket and said contained bread item with said bread-impaling spike during displacement and for guiding said bread basket and said bread item onto said bread-impaling spike.

2. The cooking utensil of claim 1, wherein said base member is operably connected to a heat source that conducts heat to said bread-impaling item for toasting at least one interior wall of said bread item defining said cavity.

3. The cooking utensil of claim 1, further comprising a heat shield surrounding said bread-impaling spike.

4. The cooking utensil of claim 1, wherein said impaling system comprises:
    a bread basket comprising:
        an open-end squeeze member comprising a planar member having first and second opposing ends formed into a cylinder so that said ends are facing each other and are separated an identified distance;
        a handle attached to each of said ends of said squeeze member for facilitating the squeezing of said bread item;
        at least one guide receiver coupled to said squeeze member; and a guide system comprising at least one elongate guide coupled to said base member, said guide receiver receives said elongate guide, thus properly aligning said bread basket and said bread item with said bread-impaling spike to facilitate the impaling of said bread item.

5. The cooking utensil of claim 4, wherein said bread basket further comprises a support portion formed over an upper end of said squeeze member for preventing upward movement of said bread item as it is impaled by said bread-impaling spike.

6. The cooking utensil of claim 4, wherein said squeeze member comprises a configuration selected from the group consisting of mesh or solid.

7. The cooking utensil of claim 1, wherein said impaling system comprises:
an open-end bread basket comprising:
first and second round portions hinged together to create a squeeze shield;
front and rear guide portions extending from respective ends of said first and second round portions;
handle portions extending from said front ends of said first and second round portions;
a guide system comprising:
first and second guide pins extending from and positioned on a side of said base member and spaced apart an identified distance; and
third and fourth guide pins extending from said base member and positioned on a side opposite that of said first and second guide pins, said third and fourth guide pins also spaced apart an identified distance so as to be symmetric with said first and second guide pins, said first and second guide pins configured to receive said rear guide portions there between and said third and fourth guide pins configured to receive said front guide pins there between once said squeeze shield is in a closed position.

8. The cooking utensil of claim 7, further comprising a heat shield comprising a first portion coupled between said first and third guide pins and a second portion coupled between said second and fourth guide pins, said heat shield annularly surrounding said base member and encircling said bread-impaling spike.

9. The cooking utensil of claim 1, wherein said impaling system comprises:
an open-ended bread basket comprising:
first and second curved plate portions pivotally coupled together by a hinged mechanism;
a crossing biased handle assembly configured to bias said first and second plates into an open position;
at least one guide bar extending down at least a portion of either of said first and second plate portions;
a guide system comprising:
an open-ended thin wall cylinder configured for receiving said bread basket therein upon said bread basket receiving said bread item and being closed and for guiding said bread basket over said bread-impaling spike; and
a wall extension extending from at least a portion of a rim of said cylinder, said wall extension functioning to guide said bread basket into an interior of said cylinder.

10. The cooking utensil of claim 9, wherein said guide system functions as a heat shield to protect the user from said bread-impaling spike.

11. The cooking utensil of claim 1, wherein said impaling system comprises:

an open-end bread basket comprising:
a first plate;
a second plate pivotally coupled to said first plate, such that said first and second plates form a bread basket enclosure when in a closed position;
a plurality of protrusions extending from an interior surface of said first and second plates for providing increased grip on said bread item once retained therein;
a handle portion coupled to each of said first and second plates;
a guide system comprising:
a support rail juxtaposed to said bread-impaling spike and comprising a thin-walled cylinder that extends upward from said base member a pre-determined distance, said support rail comprising a through slot formed along at least a portion of a length of said support rail;
a sleeve slidably disposed within said support rail and stopped by a stopper positioned at an upper end of said support rail;
a biasing member disposed within said support rail for biasing said sleeve in an upward manner against said stopper; and
at least one connector rod extending from said sleeve at one end and coupling to said first plate of said bread basket at an opposite end, thus properly aligning and supporting said bread basket in an elevated and biased position above said bread-impaling spike, said bread basket being configured to travel in a bi-directional manner about said bread-impaling spike as said sleeve travels bi-directionally within said support rail, and wherein said rod travels within said slot to facilitate the displacement of said bread basket and to prohibit it from rotating.

12. The cooking utensil of claim 11, wherein said biasing member comprises a spring.

13. The cooking utensil of claim 11, wherein said sleeve is comprised of thermo-plastic material capable of withstanding heat generated within said guide rail.

14. The cooking utensil of claim 11, wherein said first and second plates are curved to match the curvature of a bread item.

15. The cooking utensil of claim 11, further comprising handles coupled to each of said first and second plates for facilitating the opening and closing of said bread basket and the impaling of said bread item.

16. The cooking utensil of claim 11, further comprising latching means for releasably latching said first plate to said second plate.

17. The cooking utensil of claim 1, wherein said base member and said bread-impaling spike are operably coupled to a concave base mount configured for placement over a stove that functions as a heating source to heat said bread-impaling spike.

18. The cooking utensil of claim 1, further comprising a guide system operable with said bread basket for facilitating the impaling of said bread item, said guide system functioning to align said bread basket and said contained bread item with said bread-impaling spike and to guide said bread basket and said contained bread item while impaling said bread item.

19. The cooking utensil of claim 1, wherein said bread basket comprises a plurality of protrusions on an inner surface to increase the grip on said bread item.

20. The cooking utensil of claim 1, further comprising a removably heat shield surrounding said bread-impaling spike for protecting the user while impaling said bread item.

21. A cooking utensil comprising:
- a base mount configured for placement over a stove element;
- a bread-impaling spike coupled to and extending from said base mount, said impaling spike comprising an elongated body portion and a piercing end for forming a cavity within a bread item, said elongated body portion comprises a plurality of planar surfaces formed together about and around a longitudinal axis to create a closed-form cross-sectional geometric shape configured to form at least two condiment receiving channels within said cavity of said bread item upon inserting a meat item;
- a bread basket for receiving and retaining said bread item comprising:
  - first and second curved plate portions pivotally coupled together by a hinged mechanism;
  - a crossing biased handle assembly configured to bias said first and second plates into an open position;
- a guide system for receiving and aligning said bread basket and said contained bread item with said bread-impaling spike, said guide system comprising:
  - an open-end thin wall cylinder configured for receiving said bread basket therein upon said bread basket receiving said bread item and being closed and for guiding said bread basket over said bread-impaling spike; and
  - a wall extension extending from at least a portion of a rim of said cylinder, said wall extension functioning to guide said bread basket into an interior of said cylinder.

22. The cooking utensil of claim 21, wherein said bread-impaling spike further comprises a rod extending therefrom and through a surface of said concave base mount, said rod configured to be in communication with said stove element, thus functioning as a heat sink to heat said spike.

23. The cooking utensil of claim 21, wherein said bread basket further comprises at least one guide bar extending down at least a portion of the length of said bread basket to facilitate proper orientation and alignment of said bread basket within said cylinder.

24. The cooking utensil of claim 21, wherein said base member comprises a concave configuration.

* * * * *